(12) United States Patent
Fuller et al.

(10) Patent No.: US 8,795,924 B2
(45) Date of Patent: Aug. 5, 2014

(54) CROWN ETHER CONTAINING PEM ELECTRODE

(75) Inventors: Timothy J. Fuller, Pittsford, NY (US); Lijun Zou, Rochester, NY (US); James Mitchell, Bloomfield, NY (US); Michael R. Schoeneweiss, West Henrietta, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/611,046

(22) Filed: Sep. 12, 2012

(65) Prior Publication Data

US 2014/0072901 A1    Mar. 13, 2014

(51) Int. Cl.
*H01M 8/10* (2006.01)

(52) U.S. Cl.
USPC .......................................... 429/483; 429/531

(58) Field of Classification Search
None
See application file for complete search history.

(56) References Cited

U.S. PATENT DOCUMENTS

| | | | | |
|---|---|---|---|---|
| 3,668,271 | A * | 6/1972 | Haag et al. | 585/277 |
| 4,572,905 | A * | 2/1986 | Sakagami et al. | 502/402 |
| 4,687,598 | A * | 8/1987 | Varma | 252/519.33 |
| 5,916,702 | A * | 6/1999 | Marucchi-Soos et al. | 429/524 |
| 7,888,433 | B2 | 2/2011 | Fuller et al. | |
| 7,897,691 | B2 | 3/2011 | MacKinnon et al. | |
| 7,897,692 | B2 | 3/2011 | Mackinnon et al. | |
| 7,897,693 | B2 | 3/2011 | MacKinnon et al. | |
| 7,960,046 | B2 | 6/2011 | Fuller et al. | |
| 8,053,530 | B2 | 11/2011 | Fuller et al. | |
| 2003/0186106 | A1 * | 10/2003 | Frank et al. | 429/38 |
| 2007/0099054 | A1 | 5/2007 | Fuller et al. | |
| 2011/0117472 | A1 * | 5/2011 | Koestner et al. | 429/483 |
| 2011/0165459 | A1 * | 7/2011 | Halalay et al. | 429/217 |

OTHER PUBLICATIONS

Babb, D.A., "Synthesis and Metal Ion Complexation of Synthetic Ionophores," a Ph.D. Dissertation in Chemistry, Texas Tech University, Dec. 1985, 149 pgs.
Kopolow, S. et al., "Poly(vinylmacrocyclic polyethers), Synthesis and Cation Binding Properties," Macromolecules, 1973, 6, pp. 133-142.
Manecke, G. et al., "Polymere Kryptanden, 1," Makromol. Chem. 182, pp. 1973-1984 (1981).
Montanari, F. et al., "Hydroxymethyl Derivatives of 18-Crown-6 and [2.2.2]Cryptand: Versatile Intermediates for the Synthesis of Lipophilic and Polymer-Bonded Macrocyclic Ligands," J. Org. Chem., 1982, 47, pp. 1298-1302.
Smid, J. et al., "Synthesis of 4'-vinylbenzocrown ethers," Organic Preparation and Procedures Int., 1976, 8(4), pp. 193-196.

* cited by examiner

*Primary Examiner* — Patrick Ryan
*Assistant Examiner* — Haixia Zhang
(74) *Attorney, Agent, or Firm* — Brooks Kushman P.C.

(57) ABSTRACT

A membrane electrode assembly for fuel cells includes a proton conducting membrane having a first side and a second side. The membrane electrode assembly further includes an anode disposed over the first side of the proton conducting layer and a cathode catalyst layer disposed over the second side of the proton conducting layer. One or both of the anode catalyst layer and the cathode catalyst layer includes a first polymer which has cyclic polyether groups. An ink composition for forming a fuel cell catalyst layer is also provided.

10 Claims, 22 Drawing Sheets

CROWN ETHER CONTAINING PEM ELECTRODE

FIELD OF THE INVENTION

In at least one aspect, the present invention relates to proton exchange membranes and electrodes for fuel cells with improved stability.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel and oxidant to disperse over the surface of the membrane facing the fuel- and oxidant-supply electrodes, respectively. Each electrode has finely divided catalyst particles (for example, platinum particles) supported on carbon particles to promote oxidation of hydrogen at the anode and reduction of oxygen at the cathode. Protons flow from the anode through the ionically conductive polymer membrane to the cathode where they combine with oxygen to form water which is discharged from the cell. The MEA is sandwiched between a pair of porous gas diffusion layers ("GDL") which, in turn, are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cells arranged in stacks in order to provide high levels of electrical power. Although the catalyst layers used in fuel cells work reasonably well, there is a need for improved fuel cell catalyst layers.

Accordingly, there is a need for catalyst layers with improved chemical stability.

SUMMARY OF THE INVENTION

The present invention solves one or more problems of the prior art by providing a membrane electrode assembly for a fuel cell. The membrane electrode assembly includes a proton conducting membrane having a first side and a second side. The membrane electrode assembly further includes an anode disposed over the first side of the proton conducting layer and a cathode catalyst layer disposed over the second side of the proton conducting layer. At least one of the anode catalyst layer and the cathode catalyst layer includes a first polymer having an ionophore. Characteristically, the ionophore is a cyclic polyether group.

In another embodiment, an ink for forming fuel cell catalyst layers is provided. The ink composition includes a first polymer including cyclic polyether groups, a catalyst composition; and a solvent system.

In yet another embodiment, a fuel cell incorporating the membrane electrode assemblies set forth above is provided. The fuel cell includes a membrane electrode assembly interposed between an anode gas diffusion layer and a cathode gas diffusion layer. The resulting assembly is typically interposed between an anode flow field plate and a cathode flow field plate.

BRIEF DESCRIPTION OF THE DRAWINGS

Exemplary embodiments of the present invention will become more fully understood from the detailed description and the accompanying drawings, wherein.

DESCRIPTION OF THE INVENTION

Figure 1:
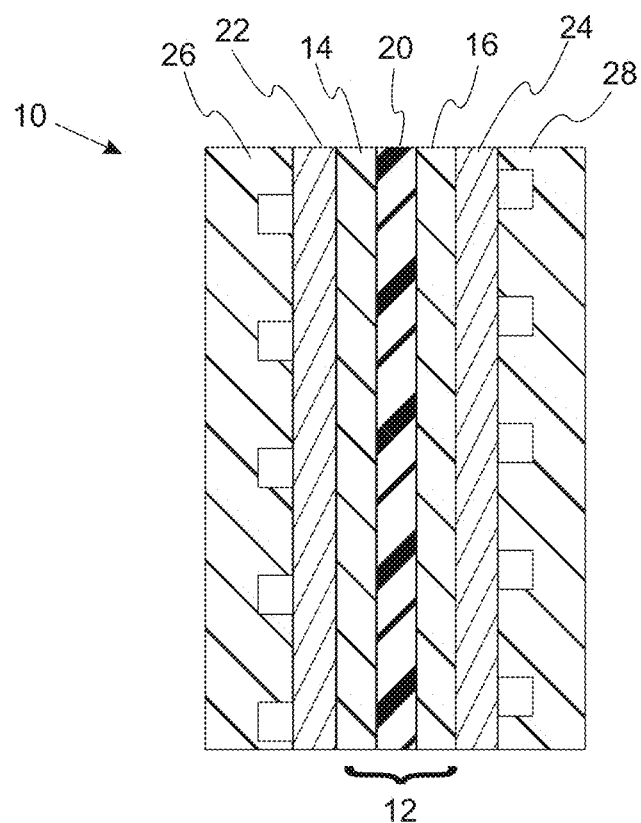
FIG. 1 is a schematic illustration of a fuel cell that incorporates a PEM with a polymer including cyclic polyether groups.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

With reference to FIG. 1, a fuel cell having a membrane electrode assembly that incorporates cyclic polyether moieties is provided. Fuel cell 10 includes the membrane electrode assembly 12 which includes anode catalyst layer 14, cathode catalyst layer 16, and ion conducting membrane (i.e., proton exchange membrane) 20. Proton (i.e., ion) conducting membrane 20 is interposed between anode catalyst layer 14 and cathode catalyst layer 16 with anode catalyst layer 14 disposed over the first side of proton conducting membrane 20 and cathode catalyst layer 16 disposed over the first side of proton conducting membrane 20. Characteristically, one or both of anode catalyst layer 14 and cathode catalyst layer 16 includes a first polymer having cyclic polyether groups. In a variation, fuel cell 10 also includes porous gas diffusion layers 22 and 24. Gas diffusion layer 22 is disposed over anode catalyst layer 14 while gas diffusion layer 24 is disposed over cathode catalyst layer 16. In yet another variation, fuel cell 10 includes anode flow field plate 26 disposed over gas diffusion layer 22 and cathode flow field plate 28 disposed over gas diffusion layer 24.

The present embodiment includes a first polymer having cyclic polyether groups. In a refinement, the first polymer having cyclic polyether groups is part of a polymeric bead. In a refinement, the cyclic polyether groups are monocyclic or polycyclic (e.g., 2 rings) having 12 to 45 member rings. In another refinement, the cyclic polyether groups are monocyclic or polycyclic (e.g., 2 rings) having 12 to 42 member rings. In another refinement, the cyclic polyether groups are monocyclic or polycyclic (e.g, 2 rings) having 12 to 39 member rings. In still another refinement, the cyclic polyether groups are monocyclic or polycyclic (e.g, 2 rings) having 12 to 36 member rings. In a refinement, the size of each ring in the cyclic polyether groups is a multiple of three. Examples of suitable polymers having cyclic polyether groups include polymers or polymeric beads including crown ether or cryptand groups. In a further refinement, one or more atoms in the polyether ring may be substituted by nitrogen atoms (aza-crowns) or sulfur atoms (thiacrowns). The crown ether may also be substituted at any location along its polyether ring by any of a variety of groups known to those skilled in the art.

In the context of the present invention, the polymers having cyclic polyether groups are ionophores. Such ionophores work advantageously in three different ways. First, ionophores when added to ionomer solutions sequester metals ions which are initially present as impurities in the ionomers and the solvents. Some of the sequestered metal ions include the Fenton's active catalysts that form hydroxyl radical with hydrogen peroxide such as iron(II), nickel(II), cobalt(II) and copper ions. Other cations, such as aluminum(III), sodium, potassium, and the like, are also sequestered. As complexes with ionophores, these ions do not as readily form hydroxyl radicals by reaction with hydrogen peroxide in the membranes like the free ions such as $Fe^{2+}$. Hydrogen peroxide is generated as a side reaction by the electrode catalyst during fuel cell operation, and hydroxyl radicals are known to cause chemical degradation failures in fuel cell membranes. In this way, the ionophores act as a chemical mitigant to prevent membrane degradation. Second, these ionophores act to sequester metal ions that are introduced into the membranes as contaminants during fuel cell operation, and in particular, $Fe^{2+}$ generated from the reaction of acidic fuel cell by-products (such as HF) with stainless steel plates. The metal ionophore complexes prevent a parasitic, autocatalytic degradation due to $Fe^{2+}$ introduced during fuel cell operation. Third, the ionophores with sequestered metal ions can be removed entirely from the ionomer coating solutions by centrifugation before the membrane is coated. The metal ions bind to the ionophores forming a complex which are removed by centrifugation. In this way, treatment of ionomer solutions can be used to purify ionomer solutions before electrode layer coating takes place. This separation process is especially advantageous when the ionophore-metal complexes are in the form of insoluble beads, fibers, particles precipitates, or sediments. All three mechanisms involving polymeric metal ionophore complexes are beneficial in improving the chemical stability of fuel cell membranes. In the electrode, the cyclic crown ether polymers sequester platinum and prevent its migration in the electrode layer to the membrane. In this way, the cyclic ethers stabilize the cathode layer and enhance durability and electrode life.

As set forth above, membrane electrode assembly 12 includes an anode catalyst layer 14 and cathode catalyst layer 16 which include a polymer having cyclic polyether groups. Polymeric ionophores such as polymers having cyclic polyether groups are added to Pt on carbon with ionomer solutions before casting polyelectrolyte electrodes (i.e., catalyst layers) for fuel cells. In a variation, the catalyst layers are formed by depositing a catalyst ink on ion conducting membrane 20 by direct spraying or coating in a shim frame. In still another variation, the catalyst layers are formed on a decal and transferred to ion conducting membrane 20. Alternatively, a catalyst/ionomer ink can be coated on a gas diffusion medium substrate, which is known as a catalyst coated diffusion media (CCDM). The catalyst inks are typically prepared as a solution of a first polymer having polymers having cyclic polyether groups and second polymer which is a proton conducting polymer or ionomer (e.g. NAFION®), with particles of electrically conductive material, typically carbon, and particles of catalyst. The electrically conductive material, e.g., carbon, is typically the catalyst support of the ink and the catalyst is typically a metal. In a variation, the catalyst layer dispersion consists of a mixture of the precious metal catalyst supported on high surface carbon (e.g., Vulcan XC-72) the first polymer having polymers having cyclic polyether groups, and the second polymer (an ionomer solution such as NAFION® (DuPont Fluoroproducts, NC)) in a solvent. Examples of useful catalysts include, but are not limited to, metals such as platinum, palladium; and mixtures of metals platinum and molybdenum, platinum and cobalt, platinum and ruthenium, platinum and nickel, and platinum and tin. The second polymer is typically purchased as an ionomer in a solvent and at the desired initial concentration. Additional solvent is optionally added to adjust the ionomer concentration to a desired concentration. In a refinement, the catalyst inks optionally contain polytetrafluoroethylene. The catalyst and catalyst support are dispersed in the ink by techniques such as ultrasonication or ball-milling. Typically, the average agglomerate size is in the range from 50 to 500 nm.

In a refinement, the ink composition includes a catalyst composition in an amount of about 1 weight percent to 10 weight percent of the total weight of the catalyst composition. Characteristically, the catalyst composition includes catalytically active material on carbon (e.g., platinum on carbon) dispersed within an ionomer solution with a solvent. The amount of catalytically active material is present in an amount from about 5 weight percent to about 40 weight percent of the catalyst composition. In a refinement, the ink composition includes ionomers in an amount from about 5 weight percent to about 40 weight percent of the catalyst composition. In another refinement, the ink composition includes polymers having cyclic ether groups in an amount from about 0.005 weight percent to about 10 weight percent of the catalyst composition. In a particular refinement, the solvent makes up about 20 to 89.095 weight percent of the total weight of the ink composition. Useful solvents include, but are not limited to, alcohols (e.g., propanol, ethanol, methanol), water, or a mixture of water and alcohols. Characteristically, the solvents evaporate at room temperature.

In another variation, the catalyst inks are homogenized by ball-milling for about three days before coating on the PEM, decal substrate, or gas diffusion medium. For shim coating, the catalyst loading can be controlled by the thickness of the shim; for the Mayer wire-wound rod coating, the catalyst loading can be controlled by the wire number. Multiple coatings can be applied for higher catalyst loading, as needed. After applying the wet ink, the solvents are dried in an oven to drive off the solvent and form the electrode. After the catalyst/ionomer coated decal dries, the catalyst/ionomer is then transferred onto a PEM by hot press to form a MEA. The anode and cathode can be hot-pressed onto a PEM simultaneously.

Examples of cyclic polyether groups used in the embodiments and variation set forth above include, but are not limited to, the following structures:

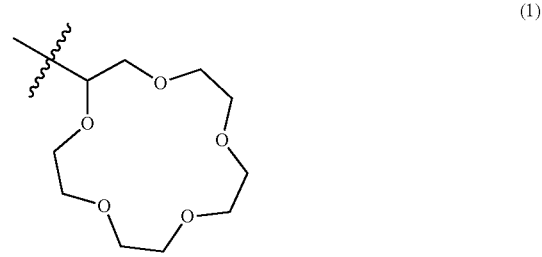

(1)

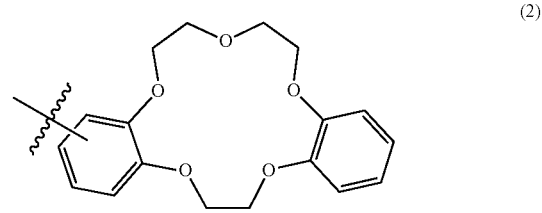

(2)

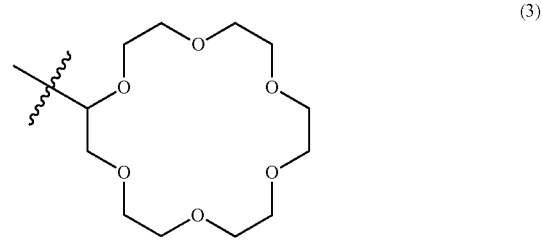

(3)

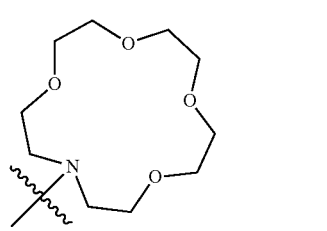
(4)
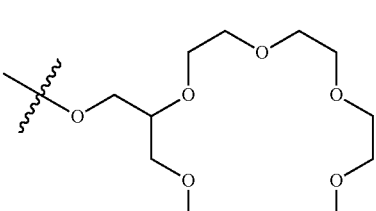
(11)
(5)
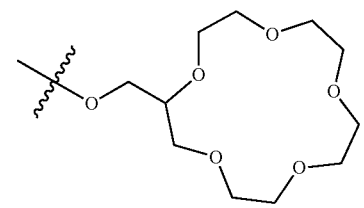
(12)
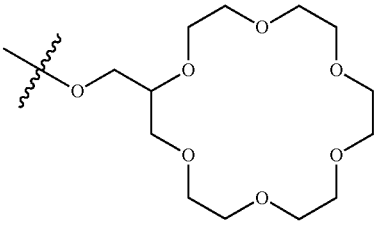
(13)
(6)
(7)
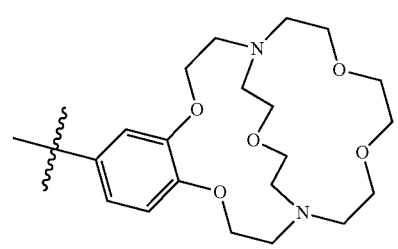
(14)
(8)
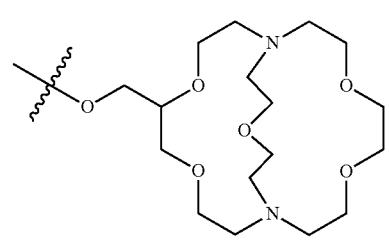
(15)
(9)
(10)
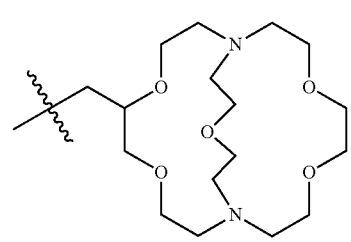
(16)

(17) 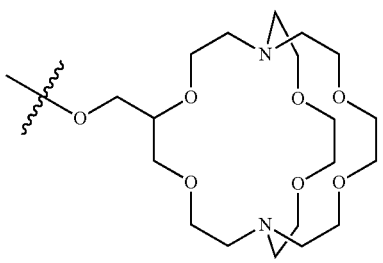

(18) 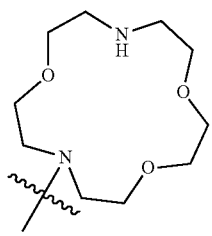

(19) 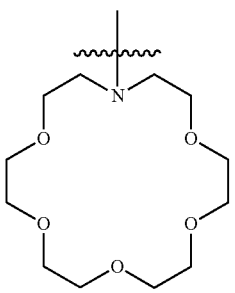

(20) 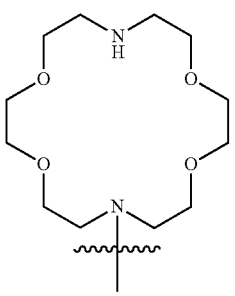

(21) 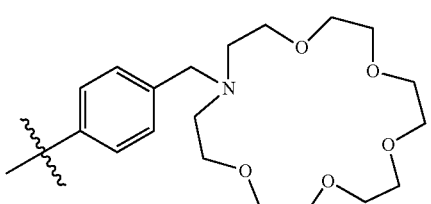

(22) 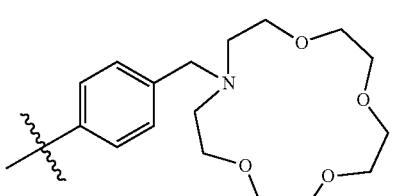

(23) 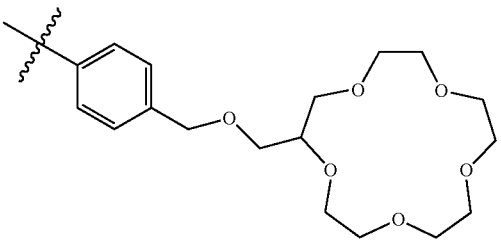

(24) 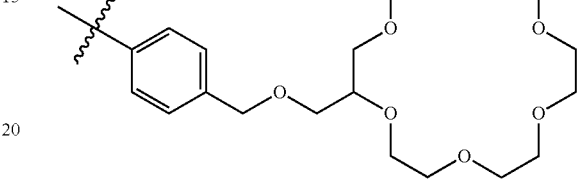

As used herein, the line crossed by a wiggly line in the chemical formulae represents the point of attachment of a chemical group to a polymer or other chemical group or structure.

In a variation of the present embodiment, the first polymer having cyclic polyether groups is a polymer. As used herein, the term polymer includes oligomers. In a refinement, such a polymer is a linear polymer. Such a linear polymer may be represented by the following formulae:

(25) 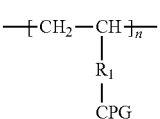

where $R_1$ is absent or a hydrocarbon group and CPG is a cyclic polyether group. When $R_1$ is absent the polymer with formula (25) reduces to:

(25') 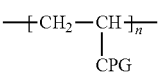

In a refinement, the CPG is selected from the groups of formulae 1 through 24. Examples of hydrocarbon groups for $R_1$ include but are not limited to, $C_{1-20}$ alkyl groups, $C_{1-18}$ polyether groups, $C_{6-20}$ alkylaryl groups, $C_{6-20}$ aryl groups (e.g., phenyl, naphthyl, etc), $C_{1-10}$ alkyl groups, or $C_{1-5}$ alkyl groups. As used herein, alkylaryl groups are groups in which an alkyl group is attached to an aromatic group (e.g., phenyl). In such groups, the alkyl group is bonded to the polymeric backbone and the aromatic group to the cyclic polyether group or the aromatic group is bonded to the polymeric backbone and the alkyl group is bonded to the cyclic polyether group. It should be appreciated that these examples include substituted or unsubstituted alkyl groups as well as branched or unbranched groups. Examples of substituted groups have one or more hydrogen atoms replaced by Cl, F, Br, OH, $NO_2$, —CN, and the like. In a refinement, the polymers having formulae (24) and (25) are formed by polymerization of compounds having formula (26) and (27) respectively:

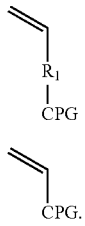

(26)

(27)

In a refinement, the first polymer having cyclic polyether groups is present in an amount from about 0.01 to about 10 weight percent of the total weight of the anode catalyst layer or the cathode catalyst layer. In another refinement, the first polymer having cyclic polyether groups is present in an amount from about 0.01 to about 5 weight percent of the total weight of the anode catalyst layer or the cathode catalyst layer. In still another refinement, the first polymer having cyclic polyether groups is present in an amount from about 0.02 to about 3 weight percent of the total weight of the anode catalyst layer or the cathode catalyst layer.

In another variation, the first polymer including cyclic polyether groups is a cyclic oligomer. Such cyclic oligomers may be formed from polymerization (e.g., emulsion polymerization) of compounds having formula 26 or 27 and a divinyl compound such as a compound described by formula 28:

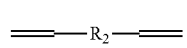

28 where $R_2$ is a hydrocarbon group. Examples of suitable hydrocarbon groups for $R_2$ include, but are not limited to, $C_{1-20}$ alkyl groups, $C_{6-20}$ dialkylaryl groups, $C_{6-20}$ aryl groups (e.g., phenyl, naphthyl, etc), $C_{1-10}$ alkyl groups, or $C_{1-5}$ alkyl groups. A dialkylaryl group includes an aromatic ring with two alkyl groups bonded thereto. An example of such a cyclic oligomer has the following formula formulae (29A and 29B):

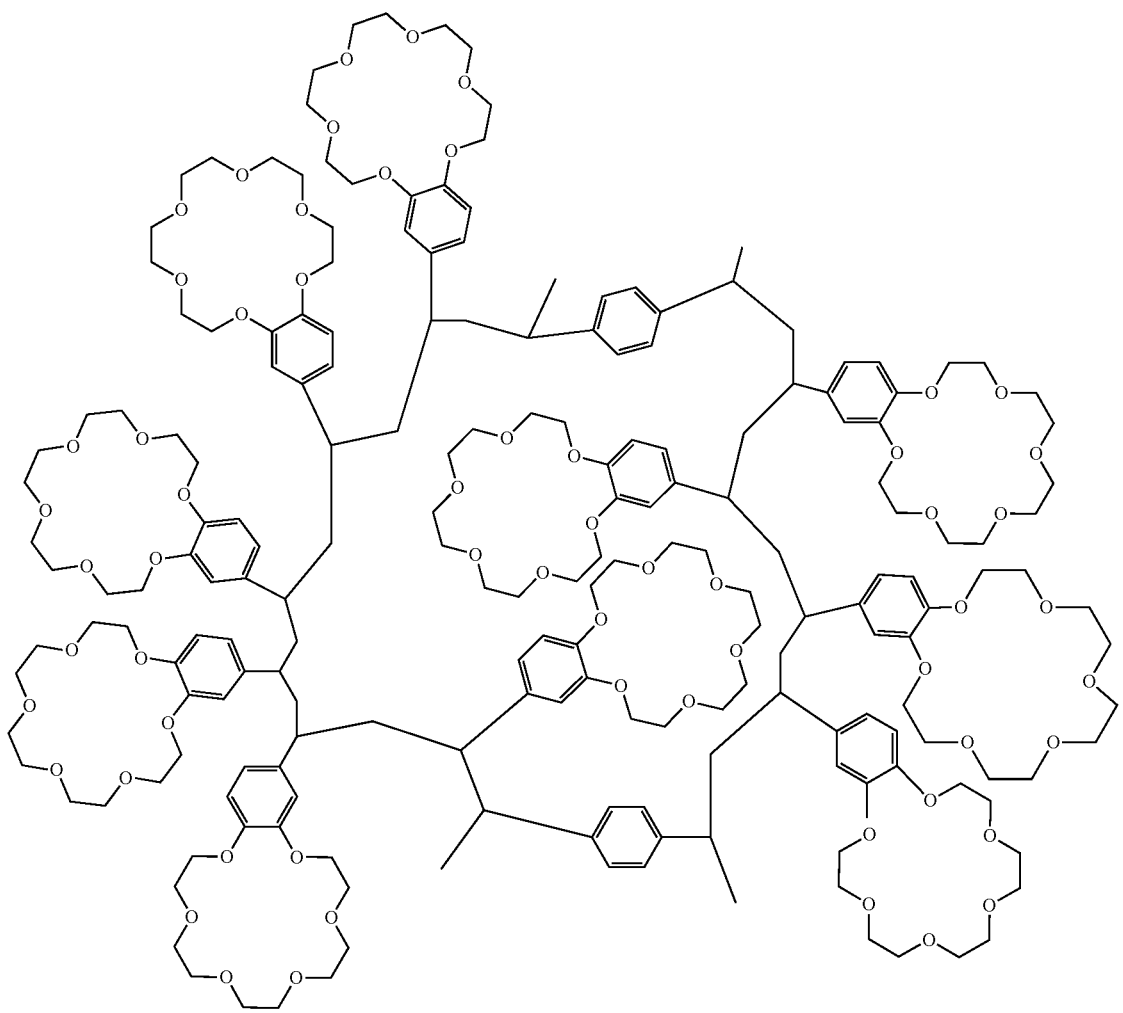

29A

-continued

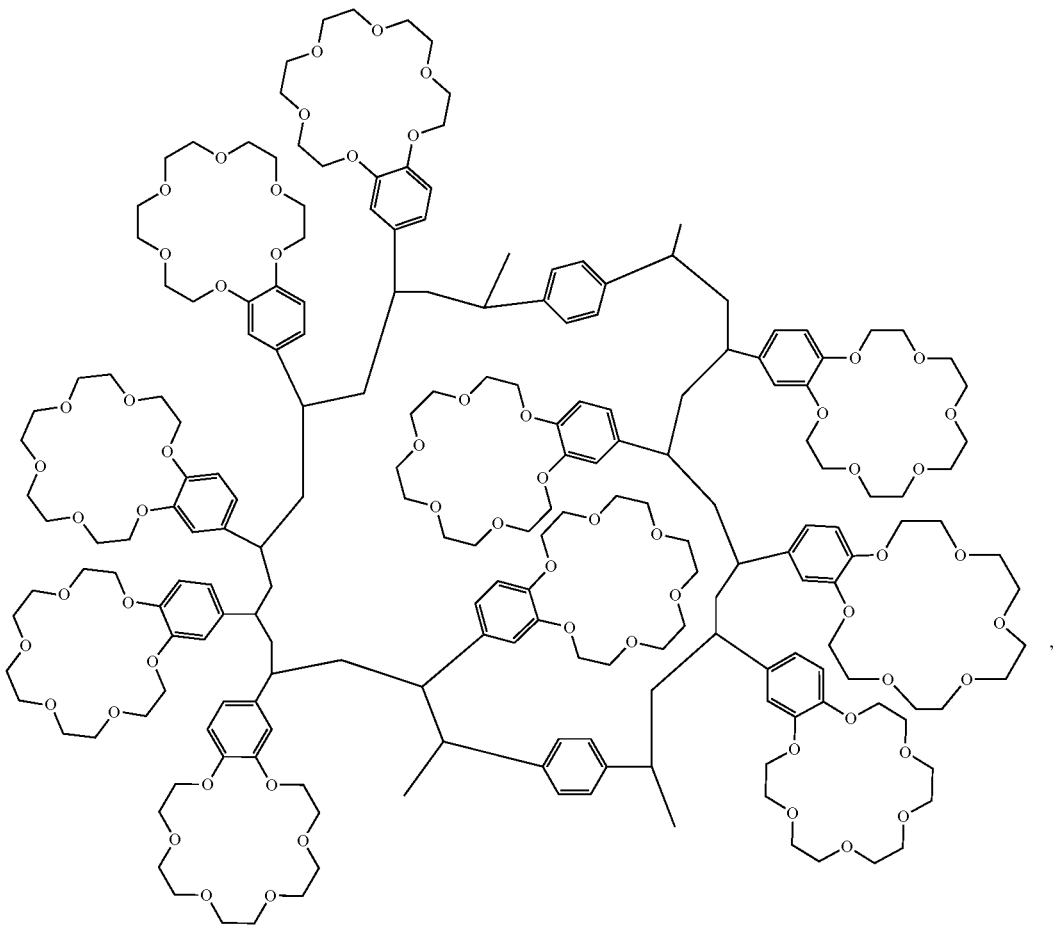

29B

In a variation, the cyclic oligomer is formed by polymerization (e.g., emulsion polymerization) of a compound having formula 34 or 35, in the presence of a compound with the general formula 28. Compound 30 and divinylbenzene are examples of compounds having the generic formula 28.

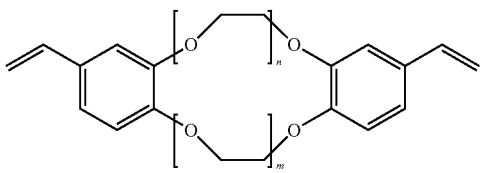

30 where n and m are each independently an integer from 1 to 8. In a refinement, n and m are each independently an integer from 1 to 4. In a further refinement, n and m are equal. Such polymerization may or may not be in the presence of a compound having formula 28.

As set forth above, membrane electrode assembly 12 includes a second polymer having sulfonic acid groups. Examples of such ion conducting polymers include, but are not limited to, perfluorosulfonic acid (PFSA) polymers, polymers having perfluorocyclobutyl (PFCB) moieties, and combinations thereof. Examples of useful PFSA polymers include a copolymer containing a polymerization unit based on a perfluorovinyl compound represented by:

$$CF_2=CF-(OCF_2CFX^1)_m-O_r-(CF_2)_q-SO_3H$$

where m represents an integer of from 0 to 3, q represents an integer of from 1 to 12, r represents 0 or 1, and $X^1$ represents a fluorine atom or a trifluoromethyl group and a polymerization unit based on tetrafluoroethylene. Suitable polymers including perfluorocyclobutyl moieties are disclosed in U.S. Pat. Pub. No. 2007/0099054, U.S. Pat. No. 7,897,691 issued Mar. 1, 2011; U.S. Pat. No. 7,897,692 issued Mar. 1, 2011; U.S. Pat. No. 7,888,433 issued Feb. 15, 2011, U.S. Pat. No. 7,897,693 issued Mar. 1, 2011; and U.S. Pat. No. 8,053,530 issued Nov. 8, 2011, the entire disclosures of which are hereby incorporated by reference. Examples of perfluorocyclobutyl moieties are:

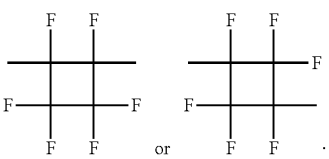

The following examples illustrate the various embodiments of the present invention. Those skilled in the art will recognize many variations that are within the spirit of the present invention and scope of the claims.

Synthetic Overview of Polymer-Bound Crown Ethers and Cryptands

The preparations of 2-hydroxymethyl-18-crown-6 (compound 31), 2-hydroxymethyl-15-crown-5 (compound 32), and 2-hydroxymethyl-[2.2.2]cryptand (compound 33) are described in Fernando Montanari and Pietro Tundo, "*Hydroxymethyl Derivatives of 18-Crown-6 and [2.2.2] Cryptand: Versatile Intermediates for the Synthesis of Lipophilic and Polymer-Bonded Macrocyclic Ligands,*" *J. Org. Chem.*, 1982, 47, 1298-1302; the entire disclosure of which is hereby incorporated by reference:

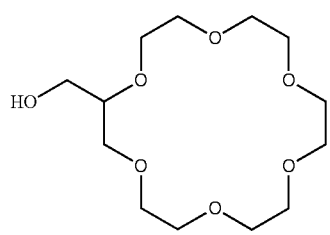

(31)

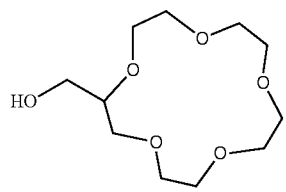

(32)

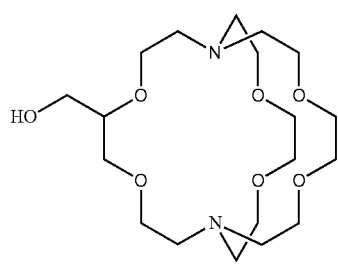

(33)

Alcohols are easily converted to compounds with vinyl groups, for example by reaction with 1-(chloromethyl)-3-vinylbenzene or 1-(chloromethyl)-4-vinylbenzene. An alternative synthesis routes to 2-hydroxymethyl-18-crown-6,2-hydroxymethyl-15-crown-5, and 2-hydroxymethyl-[2.2.2] cryptand are reported in a Ph. D. dissertation by David Alan Babb, "*Synthesis and Metal Ion Complexation of Synthetic Ionophores,*" A Ph.D. Dissertation in Chemistry, Texas Tech University, December, 1985; the entire disclosure of which is hereby incorporated by reference.

The syntheses of 4'-vinylbenzo-crown ethers such as compounds 34 and 35 are reported in J. Smid, B. El Haj, T. Majewicz, A. Nonni, and R. Sinta, "*Synthesis of 4'-vinylbenzocrown ethers.*" *Organic Preparations and Procedures Int.*, 1976, 8(4), 193-196.

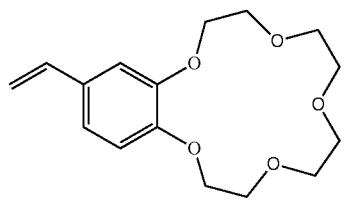

(34)

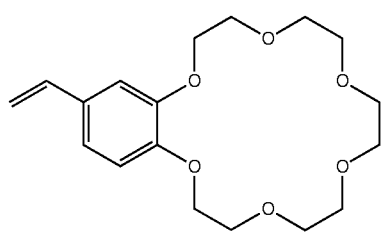

(35)

It should be noted that a bisvinylbenzo-macrocyle is also made in one step by the reaction of compound 36 with methyltriphenylphosphonium bromide and n-butyllithium in diethyl ether or tetrahydrofuran (the Wittig reaction).

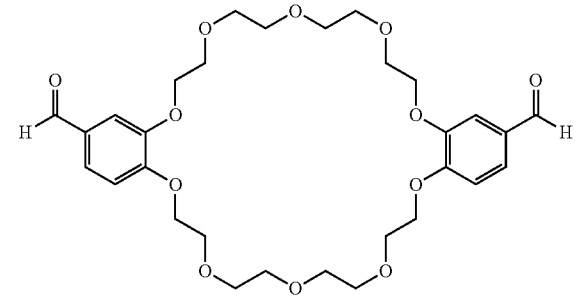

(36)

Another approach to compounds 34 and 35 is reported in the reference: S. Kopolow, T. E. Hogen Esch, and J. Smid, "*Poly(vinylmacrocyclic polyethers). Synthesis and Cation Binding Properties,*" *Macromolecules*, 1973, 6, 133; the entire disclosure of which is hereby incorporated by reference.

Figure 2:
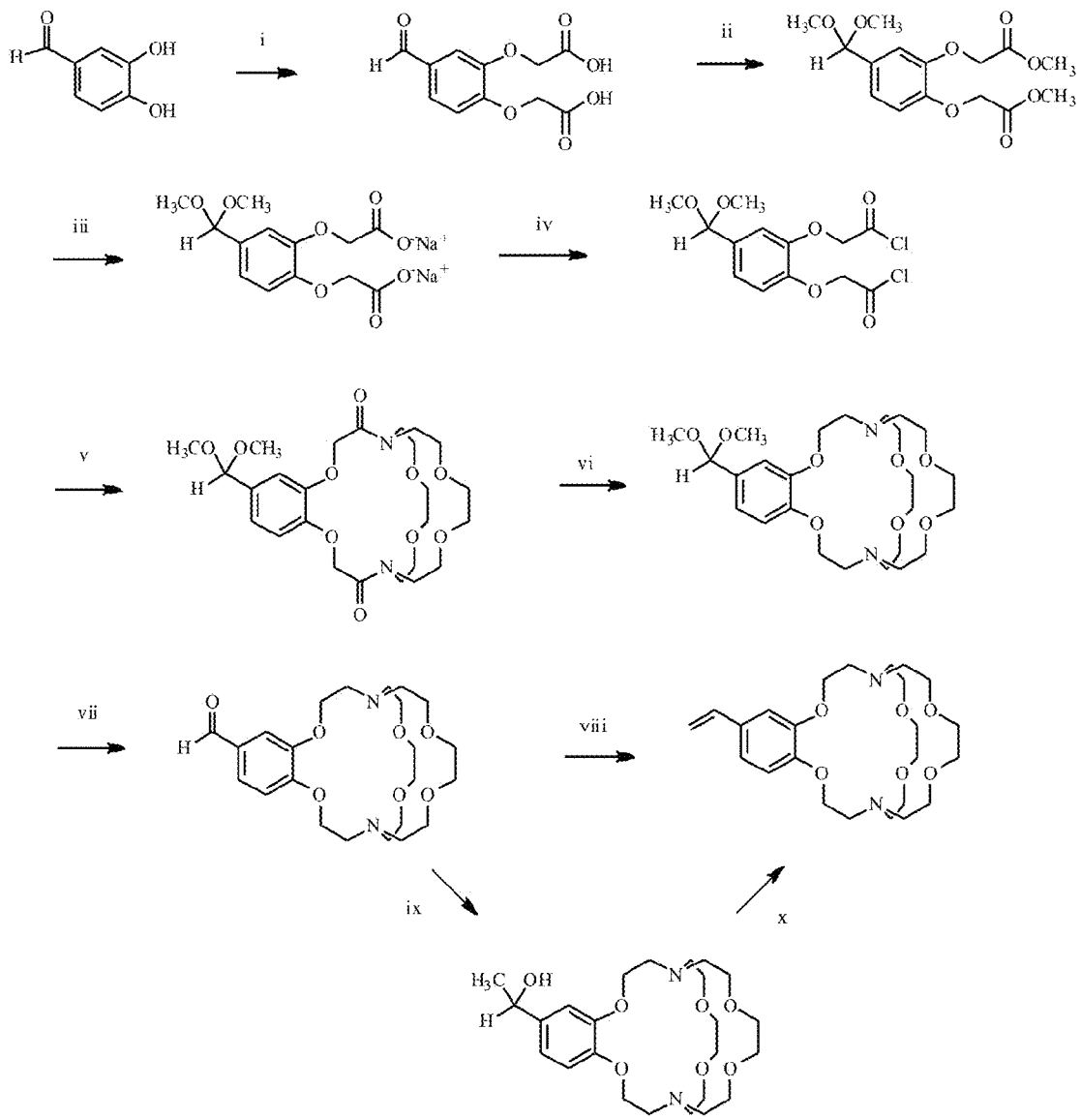
FIG. 2 provides a synthetic pathway for cyclic polyether compounds with the following: (i) $ClH_2CCOOH/K^{+-}OBu$-t; (ii) $CH_3OH/H^+$; (iii) NaOH; (iv) oxalyl chloride or a. NaOH, b. pyridine/$SOCl_2$; (v) 1,4,10,13-tetraoxa-7,16-diazacyclooctadecane; (vi) $LiAlH_4$ or $BH_3$/THF; (vii) $H^+$; (viii) methyltriphenylphosphonium bromide/n-butyllithium; (ix) methylmagnesium iodide; (x) p-toluenesulfonic acid.
Figure 3:
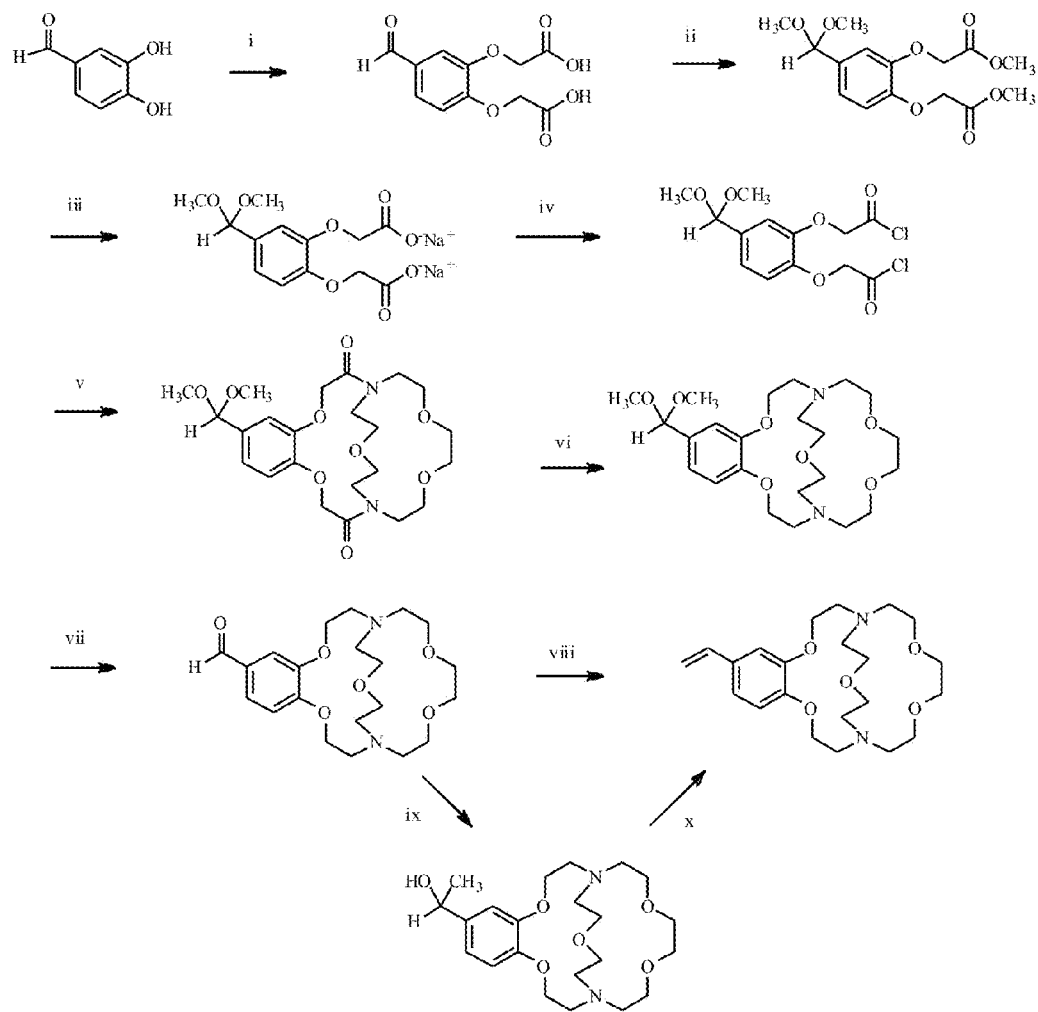
FIG. 3 provides a synthetic pathway for cyclic polyether compounds with the following: Pathway 6. (i) $ClH_2CCOOH$/$K^{+-}Ot$-Bu; (ii) $CH_3OH/H^+$; (iii) NaOH; (iv) oxalyl chloride or a. NaOH, b. pyridine/$SOCl_2$; (v) 1,4,10,13-trioxa-7,13-diazacyclopentadecane; (vi) $LiAlH_4$ or $BH_3$/THF; (vii) $H^+$; (viii) methyltriphenylphosphonium bromide/n-butyllithium; (ix) methylmagnesium iodide; (x) p-toluenesulfonic acid.
Figure 4:
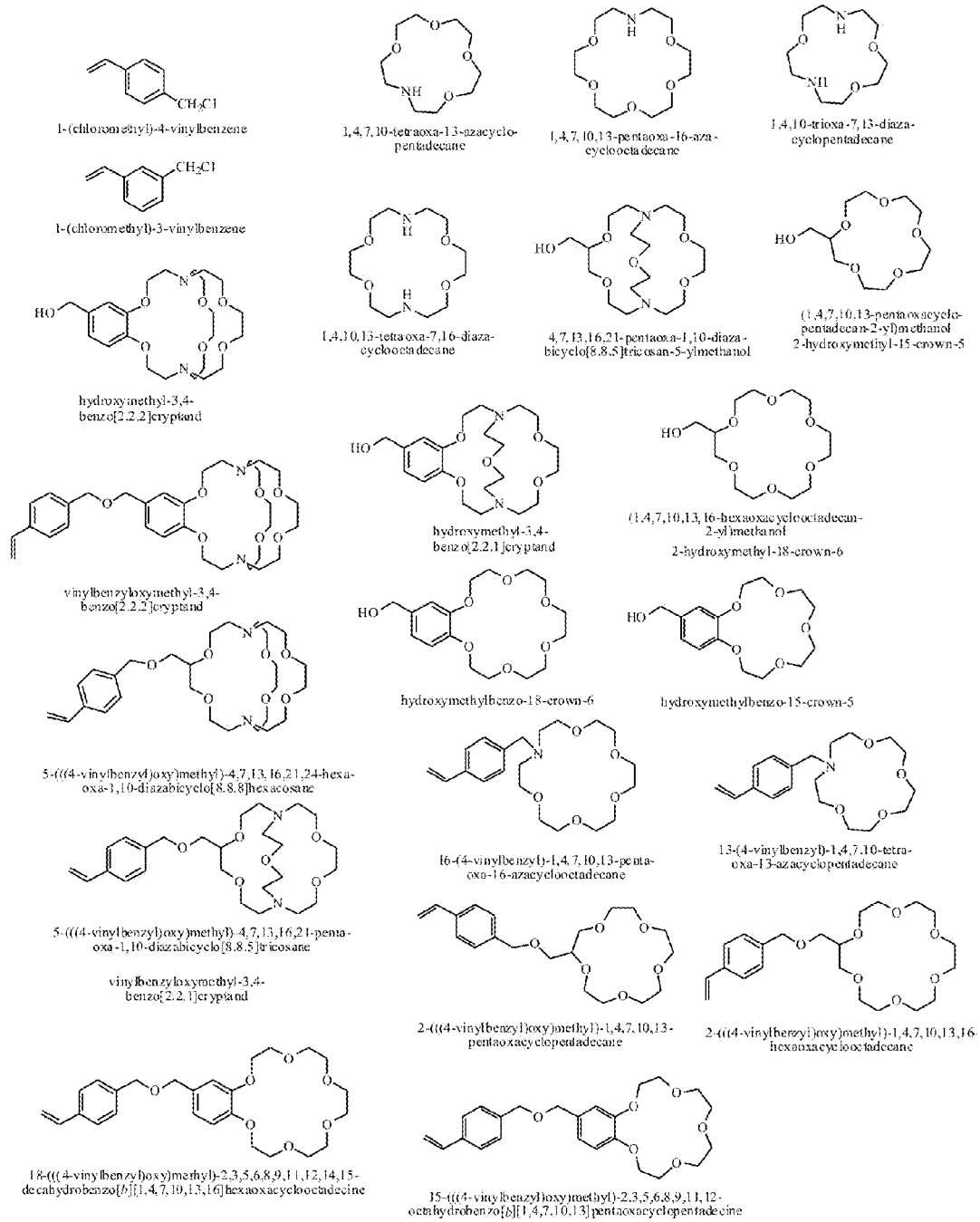
FIG. 4 provides components used in the preparation of cyclic polyethers (including isomers, such as meta- and para-)
Figure 5:
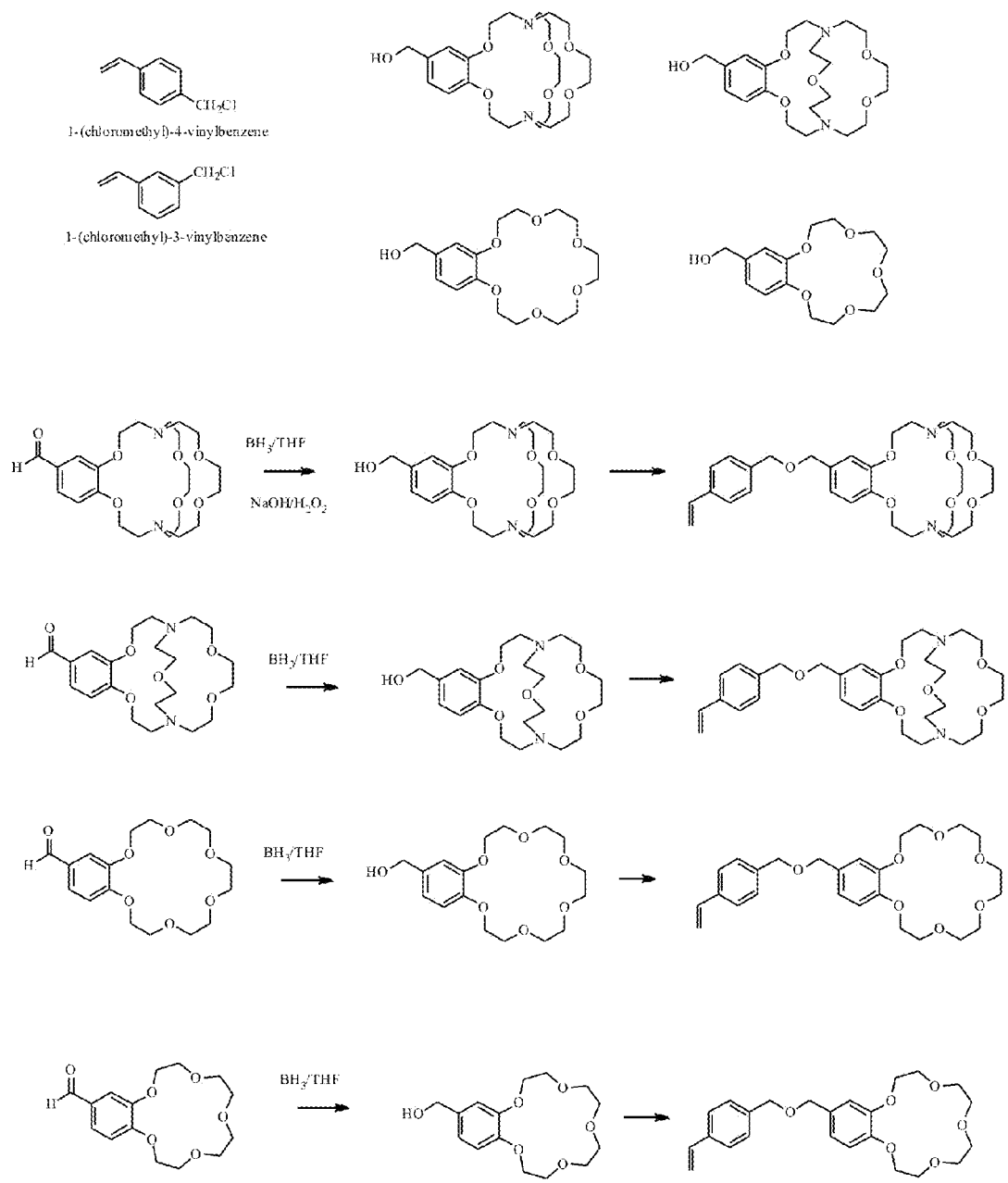
FIG. 5 provides components and reactions used in the preparation of cyclic polyethers (including isomers, such as meta- and para-)
Figure 6:
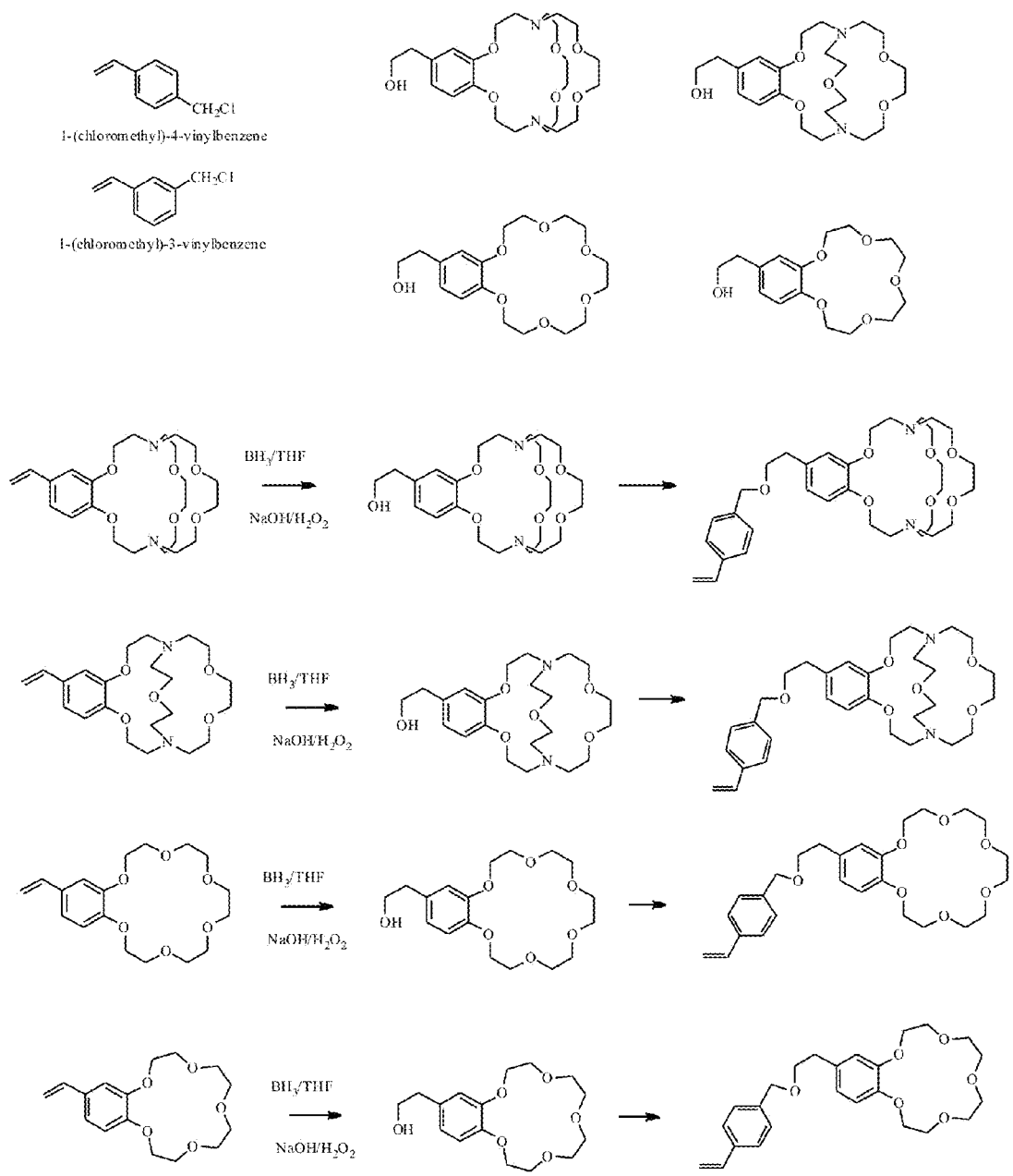
FIG. 6 provides components and reactions used in the preparation of cyclic polyethers (including isomers, such as meta- and para-)

4'-Vinylbenzo[2.2.2]cryptand and 4'-vinylbenzo[2.2.1] cryptand were prepared as shown in FIGS. 2 and 3. The new vinylbenzo[2.2.2]cryptand (compound 36) and vinylbenzo [2.2.1]cryptand (compound 37) polymerize by radicals in emulsions. However, any known vinyl polymerization method is also possible including anionic, free radical and controlled free radical polymerization methods such as RAFT, nitroxyl mediated free radical, ATRP, and the like.

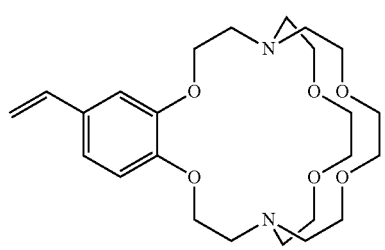

(37)

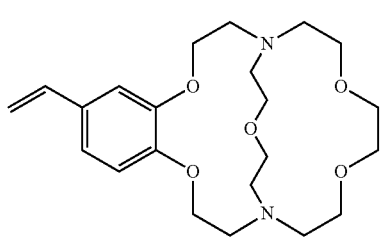

(38)

The preparation of vinylbenzo[2.2.2]cryptand and vinylbenzo[2.2.1]cryptand from 4-acetylcresol follows a similar pathways as that in Kopolow et al. and FIG. 3.

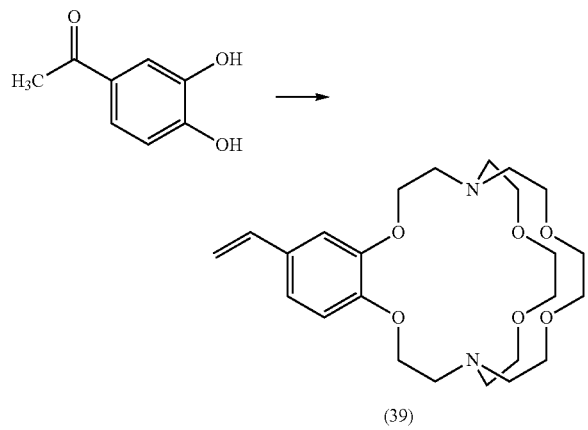

(39)

Compounds with hydroxyl groups are allowed to react with vinylbenzyl chloride and then polymerized in emulsion, or alternatively, are allowed to react with poly(11-undecylenyl iodide) in tetrahydrofuran with sodium hydride to prepare polymers with pendant crown ethers and cryptands. (see FIGS. 4 to 8)

Each of the vinylbenzyl compounds such as compounds 34, 35, 36, 37, and 38 are polymerized in emulsion with crosslinking dimers such as divinylbenzene or compound 30 to form nanoparticulate beads which are further purified by dialysis. These polymers are then added to ionomers to scavenge metal ions before the coating of electrode layers and to sequester migrating Pt(II) formed during fuel cell operation. Pt(II) is reduced back to Pt(0) by electrons at the cathode or by $H_2$ crossover gas.

Figure 7:
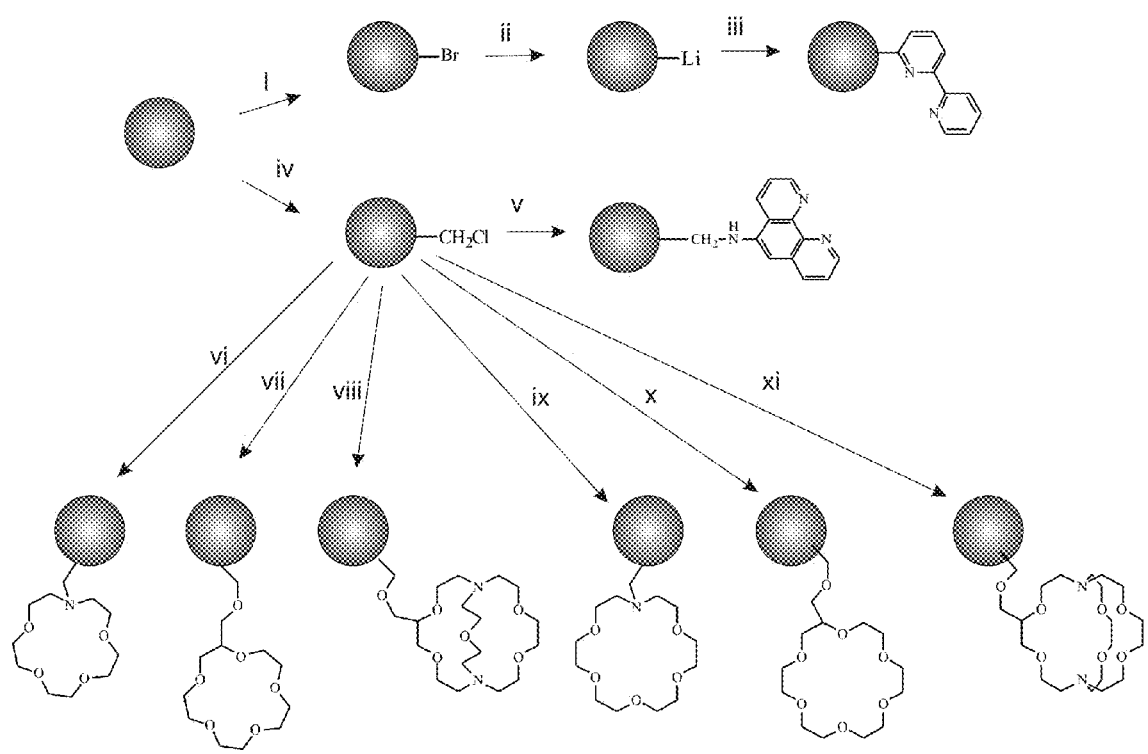
FIG. 7 provides a synthetic pathway for cyclic polyether compounds with the following: (i) $Br_2$/Fe/$CH_2Cl_2$; (ii) n-butyllithium/THF, −30° C.; (iii) bipyridine; (iv) dimethoxymethane, acetyl chloride, methanol, and $SnCl_4$ in $CH_2Cl_2$; (v) ortho-phenanthroline-4-amine; (vi) 1-aza-15-crown-5 in THF; (vii) 2-hydroxymethyl-15-crown-5 in THF with NaH; (viii) 2-hydroxymethyl[2.2.1]cryptand in THF with NaH, (ix) 1-aza-18-crown-6 in THF; (x) 2-hydroxymethyl-18-crown-6 in THF with NaH; (xi) 2-hydroxymethyl [2.2.2]cryptand in THF with NaH (It should be noted that the lower-ring structure analogs are also possible via this scheme)

Polystyrene crosslinked with divinylbenzene in the form of beads, fibers, particulates and nanoparticles are functionalized with metal ionophores as shown in FIG. 7. These materials are used as additives in fuel cell electrode layers and membrane electrode assemblies.

Figure 8:
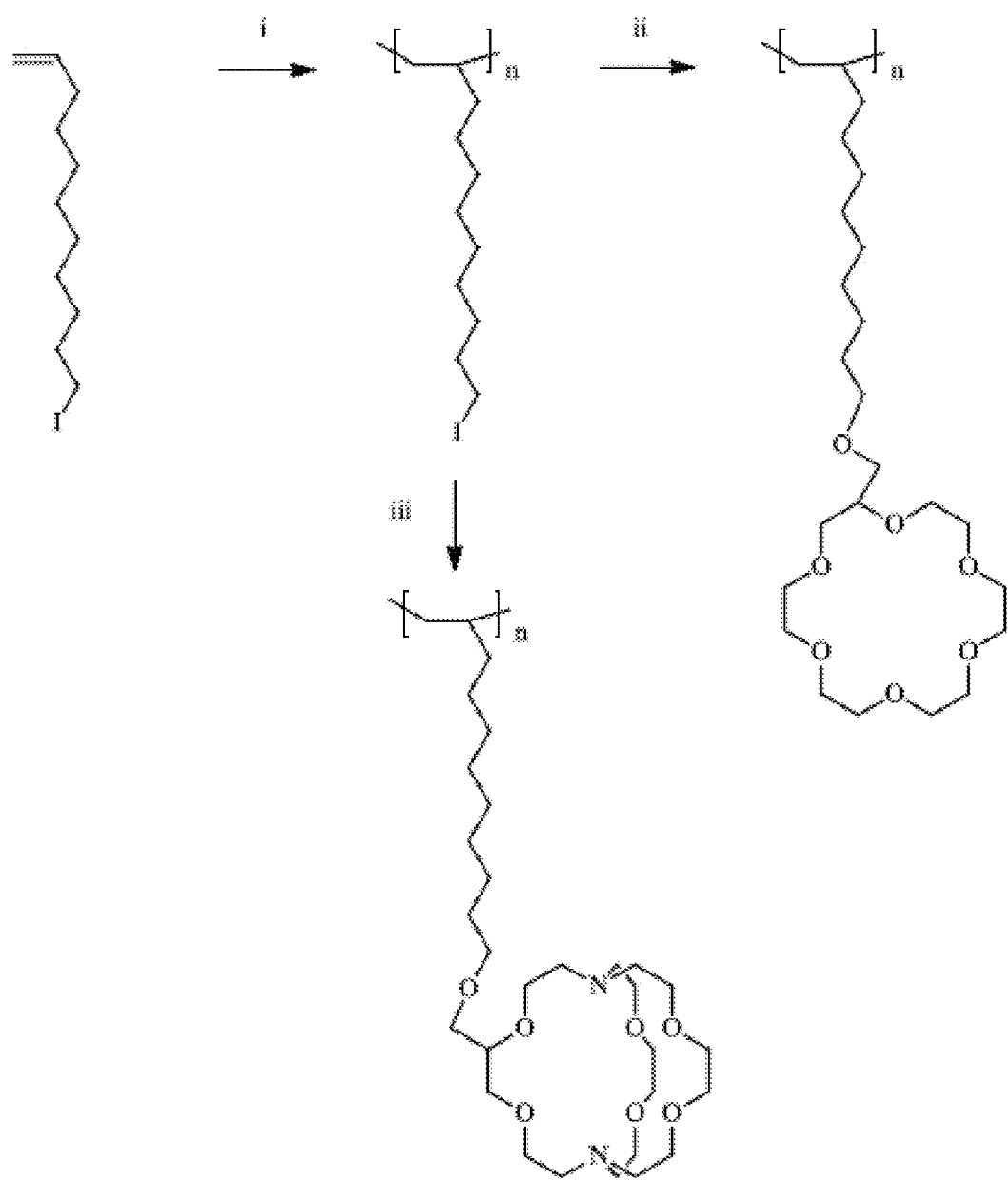
FIG. 8 provides a synthetic pathway for cyclic polyether compounds with the following: (i) $TiCl_3$*AA/diethylaluminum chloride in toluene; (ii) 2-hydroxymethyl-18-crown-6 in THF with NaH; (iii) 2-hydroxymethyl[2.2.2]cryptand (It should be noted that the lower-ring structure analogs are also possible via this scheme)

Polyolefins are prepared by the Ziegler-Natta polymerization of 1-olefins and the polymerization proceeds with a variety of functional groups in FIG. 8. In this variation, undecylenyl iodide is polymerized and then the iodo group is replaced with ionophoric groups. These materials are added to ionomer coating solutions to form fuel cell membranes.

4'-HC(O)$C_6H_3$(OCH$_2$COOH)(OCH$_2$COOH) (Compound 40)

Under argon, ClCH$_2$CCOOH (23.6 g, 0.25 mol) in t-butanol (t-BuOH, 80 mL) is added slowly to a refluxing mixture of 1-HC(O)-3,4-$C_6H_3$(OH)$_2$ (3,4-dihydroxybenzaldehyde, 13.8 g, 0.1 mol) and K$^+$ $^-$OBu-t (potassium t-butoxide, 56.1 g, 0.5 mol) in t-BuOH (400 mL). The mixture is refluxed and stirred for 4 h and then stirred at 23° C. for 6 h. The t-BuOH is evaporated under vacuum, and then H$_2$O (100 mL) is added. After extraction with Et$_2$O, the aqueous layer is acidified with HCl and is repeatedly extracted with CH$_2$Cl$_2$. The combined CH$_2$Cl$_2$ solutions are centrifuged, filtered and evaporated under vacuum to yield 4'-HC(O)—C$_6$H$_3$(OCH$_2$COOH)(OCH$_2$COOH (compound 40, 10 g).

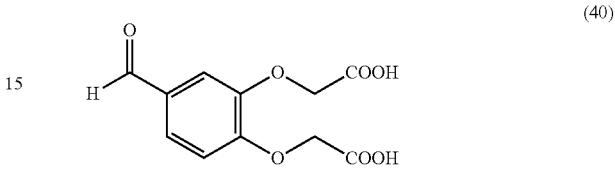

(40)

Compound 41.

Compound 40 (10 g) is dissolved in 400 mL of a 1:1 volume mixture of benzene and methanol, and then p-toluenesulfonic acid (2 g) is added. The mixture is heated to reflux for 16 h with continuous circulation of condensed vapors through anhydrous Na$_2$SO$_4$ in a thimble of a Soxhlet extractor. The solvent is removed and an ether solution of the residue is washed with 5% aqueous NaHCO$_3$. The ether layer is dried over Na$_2$SO$_4$ and then removed to yield compound 41 (10 g).

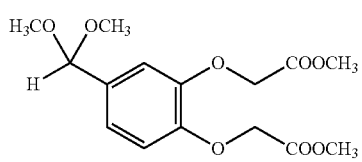

(41)

Compound 42.

The diazacrown ether, 1,4,10,13-tetraoxa-7,16-diazacyclooctadecane (1 eq) in dry THF (50 mL) is treated with two equivalents of n-butyllithium (1.6 M in hexanes) and is added dropwise to compound 41 (0.5 eq) in THF (50 mL) with magnetic stirring. After stirring 16 h at 23° C., the mixture is stirred at reflux for 8 h. Removal of the solvent yielded the cryptand diamide. Reduction with LiAlH$_4$ in THF, followed by acid hydrolysis, and then reaction with LiCH$_2$P(C$_6$H$_5$)$_3$ in ether produces compound 42:

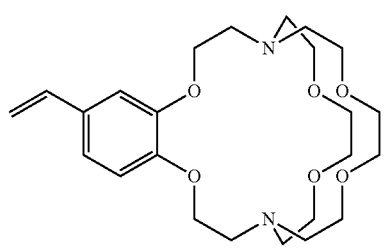

(42)

Compound 43.

A 50 wt. % solution of aqueous sodium hydroxide (5 mL) is added dropwise to a stirred solution of 5 g of compound 2 in methanol while keeping the temperature at less than 40° C. The mixture is left at 23° C. for 4 h, extracted with 100 mL ether, and acidified with dilute hydrochloric acid. After repeated extraction with CH$_2$Cl$_2$, drying of the combined organic layers over Na$_2$SO$_4$, filtration and evaporation, the diacid is obtained. The diacid (0.906 mmol) is dissolved in 20 mL of dry benzene and oxalyl chloride (10.7 g, 84 mmol) is added all at once. A small amount of pyridine (3 drops) is added as a catalyst which causes an immediate reaction. The flask is fitted with a drying tube and stirred for 48 h at 23° C. The mixture is then quickly filtered under nitrogen through a dry sintered glass Schlenk funnel, the solvent is evaporated in vacuo, and then co-evaporated once with dry benzene. The residue compound 43 is stirred under vacuum for 30 minutes and then used immediately after it is produced.

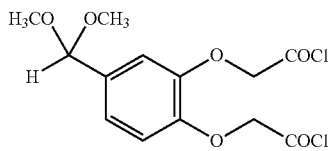

43

4'-Vinylbenzo-[2.2.2]Cryptand (compound 44)

The diazacrown ether, 1,4,10,13-tetraoxa-7,16-diazacyclooctadecane, and triethylamine (2.50 g, 24.7 mmol) diluted to 110 mL in toluene and the diacid chloride compound 43 (9.2 mmole) diluted to 110 mL in toluene are added simultaneously to 350 mL of toluene, with vigorous stirring at 0-5° C. in a Morton flask over a period of 7-8 h. After the addition is completed, the mixture is stirred overnight at 23° C. The solid precipitate is filtered and washed with toluene and then Et$_2$O. The filtrate is combined with the washings and evaporated in vacuo, and the residue is subjected to chromatography on alumina using EtOAc/MeOH (40:1) as eluent to give the cryptand diamide. To a solution of the cryptand diamide (5.4 mmol) stirring at 23° C. in 10 mL dry THF is added dropwise a 1.0 M solution of BH$_3$.Me$_2$S complex (20 mL) in THF and the mixture is stirred at reflux for 9 h. The solution is cooled to 23° C., then cooled in an ice bath, and water (5 mL) is added slowly to destroy the excess BH$_3$. The solution is evaporated in vacuo and the remaining solid is refluxed in a mixture of water (10 mL) and 6 N HCl (15 min) for 12 h. After cooling the solution to 23° C., 50 wt. % NaOH is added slowly with stirring to adjust the pH to 10 and the solution is evaporated in vacuo. The resulting precipitate is washed with 2×30 mL of MeOH. The washings are combined after filtration and Et$_2$O is added to precipitate the inorganic salts by adding a small amount of Et$_2$O, filtering the solution, collecting the filtrate and then adding more Et$_2$O. This is done repeatedly, evaporating some solution to reduce the volume needed, until no more solid precipitated from solution. The filtrate is evaporated in vacuo and the residue is purified by chromatography on alumina using CHCl$_3$/MeOH (25:1) as eluent to give 4'-formylbenzo-[2.2.2]cryptand. Alternatively, the cyclic diamide in THF (20 mL) is added at 23° C. to a stirred suspension of LiAlH$_4$ in THF (20 mL). The solution is stirred at reflux for 24 h, cooled to 23° C. and then to 0° C. with an ice bath. A solution of 15% NaOH (2 mL) is added and the suspension is stirred 24 h. After filtration and solvent evaporation, the residue is subjected to chromatography on alumina using CHCl$_3$ and ethanol (25:1) as eluent to give the cryptand. Using a gas-tight syringe, 1.2 mL of a 1.6 M solution of n-butyllithium in hexanes is added to methyltriphenylphosphonium bromide (2.11 g) in dry ether (100 mL) under argon with magnetic stirring. The yellow mixture is boiled at reflux under argon for 1 hour, and 4'-formylbenzo-[2.2.2]cryptand (1.2 g) in dry ether (50 mL) is added dropwise. Boiling at reflux is continued for 1 h and then the reaction is stirred 48 h at 23° C. The solution is filtered and the ether layer is filtered through a plug of Merck silica in a column eluting with ether. After a second filtration through a plug of silica with ether, the ether is removed and 4'-vinylbenzo-[2.2.2]cryptand, (1 g) is obtained.

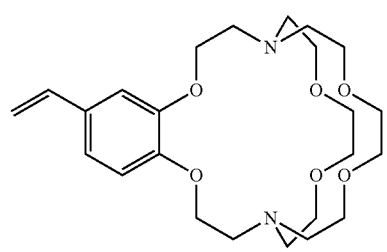

(44)

Preparation of [4'-HC(O)C$_4$H$_3$(O—)$_2$ (CH$_2$CH$_2$OCH$_2$CH$_2$OCH$_2$CH$_2$)] (Compound 45) and Compound 46

To 1-L of t-butanol is added 1-HC(O)C$_4$H$_3$(OH)$_2$ (3,4-dihydroxybenzaldehyde, 0.2 mol, 27.6 g) and the mixture is purged 0.5 h under N$_2$. A solution of K$^{+-}$OBu-t (46 g, 0.41 mol) is added in t-BuOH (328 mL), and then (ClCH$_2$CH$_2$OCH$_2$CH$_2$)$_2$O (46.2 g, 0.2 mol) is added over 15 minutes. The reaction mixture is then refluxed 24 hours. The mixture is cooled, and the solvent is removed using a rotary evaporator. Water is added and the mixture is extracted multiple times with CH$_2$Cl$_2$, the combined organic layers are dried over sodium sulfate, filtered and then the solvent is evaporated. The residue is extracted multiple times with ether (0.5 L each) to yield 20 g of [4'-HC(O)C$_4$H$_3$(O)$_2$(CH$_2$CH$_2$OCH$_2$CH$_2$OCH$_2$CH$_2$)], 4'-formylbenzo-15-crown-5 (compound 45), and compound 46.

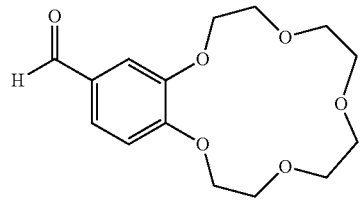

(45)

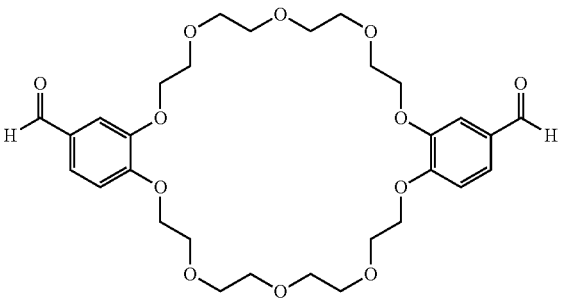

(46)

Preparation of [4'-HC(O)C$_4$H$_3$(O—)$_2$ (CH$_2$CH$_2$OCH$_2$CH$_2$OCH$_2$CH$_2$)] (Compound 45) and Compound 46

To 1-L of t-butanol is added HC(O)C$_4$H$_3$(OH)$_2$ (3,4-dihydroxybenzaldehyde, 0.2 mol, 27.6 g) and the mixture is purged 0.5 h under N$_2$. A solution of K$^{+-}$OBu-t (46 g, 0.41 mol) is added in t-BuOH (328 mL), and then (ClCH$_2$CH$_2$OCH$_2$CH$_2$)$_2$O (46.2 g, 0.2 mol) is added over 15 minutes. The reaction mixture is then refluxed 60 hours at 70° C. The mixture is cooled, and the solvent is removed using a rotary evaporator. The residue is washed with hexanes to remove residual unreacted ether and then is washed with diethyl ether. Aqueous 10 wt. % hydrochloric acid (100 mL) is added and the mixture is extracted multiple times with CH$_2$Cl$_2$. The combined organic layers are separated with the aid of a centrifuge and then dried over sodium sulfate, filtered and then the solvent is evaporated. The residue is extracted multiple times with ether (0.5 to 1 g of 4 dissolves in 1 L of ether) to yield 9.66 g of recrystallized [4'-HC(O)C$_4$H$_3$(O)$_2$ (CH$_2$CH$_2$OCH$_2$CH$_2$OCH$_2$CH$_2$)], 4'-formylbenzo-15-crown-5 (compound 45), and compound 46 (1.256 g).

Preparation of 6,7,9,10,12,13,15,16,23,24,26,27,29, 30,32,33-hexadecahydrodibenzo[b,q][1,4,7,10,13,16, 19,22,25,28]decaoxacyclotriacontine-2,20-dicarbaldehyde (compound 47)

The methyl Grignard is made by adding MeI (17.5 g) and dry ether (50 mL) to 3 g Mg in dry ether (20 mL). After the Mg dissolves, 7 g of compound 46 in 400 mL of dry ether/100 mL of dry benzene are added dropwise. A white precipitate forms immediately. After complete addition, the mixture is heated 1 h at reflux, then cooled, and 15% aq NH$_4$Cl solution is added until two layers form. The aqueous layer is extracted 4 times with 100 mL CHCl$_3$. The Et$_2$O and CHCl$_3$ layers are combined and dried. The residue is recrystallized from 500 mL ether to give 5 g of compound 47:

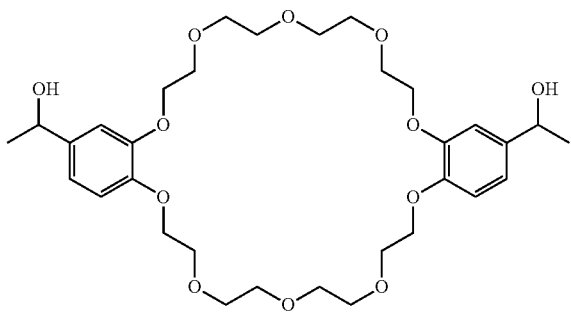

(47)

2,20-divinyl-6,7,9,10,12,13,15,16,23,24,26,27,29,30, 32,33-hexadecahydrodibenzo[b,q][1,4,7,10,13,16,19, 22,25,28]decaoxacyclotriacontine (compound 48)

A trace of p-toluenesulfonic acid monohydrate is added to 4 g compound 47 in 350 mL benzene. The mixture is refluxed with removal of H$_2$O for 14 h. After cooling to 23° C., 5 drops of pyridine are added. Benzene is evaporated and the product crystallizes on standing. Compound 48 is dissolved in 100-mL CH$_2$Cl$_2$, extracted 4 times with 100-mL H$_2$O, and then the CH$_2$Cl$_2$ is dried over Na$_2$SO$_4$. The CH$_2$Cl$_2$ is removed, and the residue recrystallizes from petroleum ether (1 g of compound 48 in 75 mL) to give 3 g of compound 48:

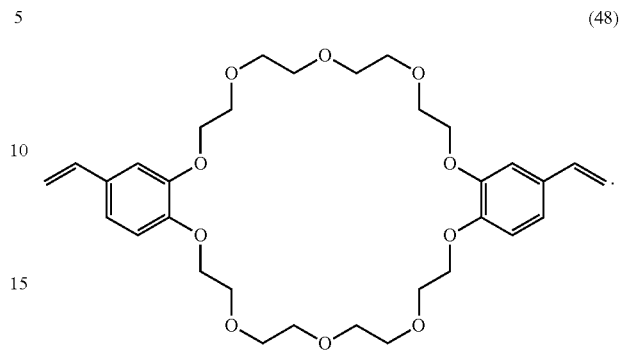

(48)

Preparation of 11-Undecylenyl iodide

To a 250-mL round-bottom flask with mechanical stirrer, reflux condenser and addition funnel are added NaI (43.5 g, 0.29 mol) and acetone (75 mL). Undecylenyl chloride (43 g, 0.2226 mol) is added dropwise and the mixture is refluxed for 16 h. More NaI (9 g) is then added and boiling at reflux is continued for 4 days. CH$_2$Cl$_2$ is added, and the reaction mixture is filtered. The solvent is removed and the residue is vacuum distilled. The fraction collected between 95-98° C. at 1 mm Hg is 11-iodoundecene.

Preparation of Poly(11-undecylenyl iodide)

Undecylenyl iodide (5 g), toluene (30 g), Et$_2$AlCl (10 mL of a 1.8 M solution), TiCl$_3$.AA (0.5 teaspoon, ≈2 g), and 16 h at 25° C. are combined. After 16 h, the mixture is blended with methanol, and the filtered polymer is washed with water and then methanol. Other ratios used include: undecylenyl iodide (12 g), toluene (40 g), Et$_2$AlCl (22 mL of a 1.8 M solution), TiCl$_3$.AA (1 teaspoon), and then 16 h at 25° C.

Reaction of Cryptand (compound 49) and Poly(11-undeclenyl iodide)

Freshly distilled tetrahydrofuran (100 mL) and about 60 wt. % sodium hydride in mineral oil (6 g) are added to poly (11-undecylenyl iodide) (1 g). With magnetic stirring under argon, compound 49 (2 g) is added and the mixture is stirred at 23° C. for 7 days. Isopropanol is added cautiously to quench the remaining sodium hydride. The reaction mixture is concentrated using a rotary evaporator and then is added to water (100 mL). The mixture is centrifuged and the solids are washed with water, centrifuged, and then dried.

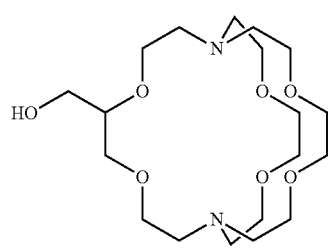

(49)

Reaction of 2-Hydroxymethyl-18-crown-6 and Poly(11-undecylenyl iodide)

Freshly distilled tetrahydrofuran (100 mL) and about 60 wt. % sodium hydride in mineral oil (6 g) is added to poly (11-undecylenyl iodide) (1 g). With magnetic stirring under argon, 2-hydroxymethyl-18-crown-6 (compound 31, 2 g) is added and the mixture is stirred at 23° C. for 7 days. Isopropanol is added cautiously to quench the remaining sodium hydride. The reaction mixture is concentrated using a rotary evaporator and then is added to water (100 mL). The mixture is centrifuged and the solids are washed with water, centrifuged, and then dried. Increasing the reaction temperature turns the resultant polymer brown without further increasing the replacement of iodide by the 2-hydroxymethyl-18-crown-6, as determined with infrared spectroscopy.

Polymerization of 4'-Vinylbenzo-18-Crown-6

Compound 35 [4'-vinylbenzo-18-crown-6 (3 g)] and divinylbenzene (0.1 g) are added to a mixture of potassium persulfate (0.02 g), sodium hydrogen phosphate (0.02 g) and sodium dodecylsulfate (0.2 g) in 40 mL of deionized water in a beverage bottle (6.5 fluid ounce volume) equipped with a rubber septum and a magnetic stir bar. The emulsion is sparged with argon for 30 minutes and is then heated at 70° C. for 48 hours. After cooling, the contents of the bottle are transferred to Spectropore dialysis tubing and dialyzed for 1 week against 4-liters of deionized water with water changes occurring at least twice per day. The residue is freeze dried to yield 3 gram of fibers.

Emulsion Polymerization of 4'-Vinyl benzo-18-crown-6

To a 50-mL, one-neck flask with a 14/20 joint is added a stir bar, water (10 g), potassium persulfate (0.005 g), sodium hydrogen phosphate (0.005 g), and sodium dodecyl sulfate (0.05 g). After this mixture dissolves, 4'-vinylbenzo-18-crown-6 (Sigma-Aldrich, 1 g) and freshly distilled divinylbenzene (1 drop, 0.05 g) is added. The flask is then equipped with a reflux condenser, a yellow Keck clamp, and a rubber suba seal septum for sparging the liquid with argon using a long needle for an argon gas inlet and another needle connected to a silicone oil bubbler for an exit. Argon is passed over the emulsion to replace the air and disperse the reactants for 30 minutes. The argon is removed and the mixture in the sealed flask is stirred in a 70° C. oil bath for 2 h, then at 95° C. (oil bath set temperature) for 16 h. The cooled emulsion is transferred to a dialysis tube (Spectropore) and dialyzed for 1 week with frequent water changes. After freeze-drying 0.9 g of poly(vinylbenzo-18-crown-6) is obtained in the form of 120 nm diameter white beads. These beads are added to ionomer solutions such as TCT891 (Tetramer Technologies, L.L.C.), NAFION® DE2020® (DuPont deNemours), IG100 (Asahi Glass), and the like, and are used in fuel cell electrode layers. One fuel cell test is performed with the beads remaining suspended in the ionomer solution before coating at 5 wt. % poly(vinylbenzo-18-crown-6) based on ionomer solids. Another fuel cell test is performed after centrifuging the ionomer mixture and decanting the ionomer solution from the sediment at the bottom of the centrifuge vessel. The liquid ionomer phase is then about 100 nm in diameter. TCT891 is a perfluorocyclobutane multi-block copolymer with perfluorosulfonic acid side groups available from Tetramer Technologies, LLC. The structure is shown below. The molar ratio of biphenyl to hexafluoroisopropylidene biphenyl moieties is 2 to 1, and the ion exchange capacity of the polymer is 1.55 meq $H^+$/g ionomer. The overall number average molecular weight of the polymer by size exclusion chromatography is 60,000, while that of the biphenyl chains is about 8,000. The hexafluoroisopropylidene biphenyl groups are interspersed between the 8000-number average molecular weight biphenyl segments (about 9 groups) in a less defined way, because these are introduced individually during the polymerization instead of being added as an oligomer segment. The polydispersity of the polymer, defined as weight average molecular weight divided by number average molecular weight, is 1.3. The polymer is soluble in alcohols (methanol, ethanol, 1-propanol and isopropanol) and in polar aprotic solvents such as N,N-dimethylacetamide, N,N-dimethylformamide, and N-methylpyrrolidone.

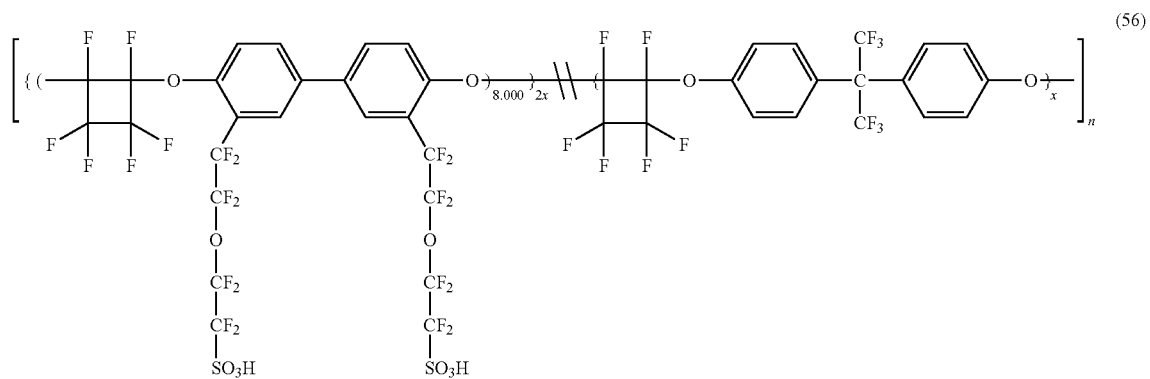

(56)

Polymers with this structure are further described in U.S. Pat. Nos. 7,897,691; 7,960,046; and 8,053,530.

In general, the polymers which include cyclic polyether groups are used in an anode ink and in particular, a cathode ink, as an additive to form fuel cell anodes and cathodes.

MEA Preparation Using Poly(Vinylbenzo 18-Crown-6) as Cathode Additive

The synthesized poly(vinylbenzo-18-crown-6) is incorporated as an additive to the cathode ink solution at 5 wt. % based on ionomer weight to fabricate cathode electrodes with a target loading of ~0.2 mg Pt/cm². Membrane-electrode-assemblies (MEAs) are made with the prepared cathode along with the standard anode with a loading of 0.05 mg Pt/cm². The MEAs are tested for fuel cell performance (i.e., polarization curves) using $H_2$/air (anode/cathode), cathode oxygen reduction reaction (ORR) kinetic activities using $H_2/O_2$ (anode/cathode), and durability by voltage-current cycling (V-C cycling) at 80° C. Results are compared with MEAs made with standard cathode and anode.

Electrode Ink Preparation.

The cathode ink solution is prepared on a 40 g scale and the ingredients used in the formulation are listed in Table 1 as below. The mixture solution is ball-milled with $ZrO_2$ beads for 3 days before coating. Standard anode with 0.05 mg Pt/cm² is prepared from 20% Pt/V (graphite) and IG100 ionomer (Asahi Glass). The weight ratio of ionomer to carbon (I/C ratio) is fixed at 0.95 for the cathode and 0.6 for the anode to ensure good coating quality.

TABLE 1

The cathode ink formulation with 5 wt. % additive of poly(vinylbenzo-18-crown-6) based on ionomer at a loading of 0.2 mg Pt/cm².

| Ingredients | Mass (g) |
| --- | --- |
| 30% PtCo/HSC Alloy Catalyst | 1.74 |
| $ZrO_2$ Beads (5 mm) | 50.00 |
| $H_2O$ | 4.99 |
| EtOH | 29.29 |
| IG100 (28.62 wt % in EtOH:$H_2O$ = 60.1:39.9) | 3.98 |
| Poly(vinylbenzo-18-crown-6) | 0.06 |
| Ink Total | 40.06 |

TABLE 2

The standard cathode ink formulation at a loading of 0.2 mg Pt/cm².

| Ingredients | Mass (g) |
| --- | --- |
| 30% PtCo/HSC Alloy Catalyst | 1.74 |
| $ZrO_2$ Beads (5 mm) | 50.00 |
| $H_2O$ | 4.99 |
| EtOH | 29.29 |
| IG100 (28.62 wt % in EtOH:$H_2O$ = 60.1:39.9) | 3.98 |
| Ink Total | 40.00 |

MEA Preparation.

Electrode inks are coated using a Meyer rod on poly(ethylene-tetrafluoroethylene) (ETFE) substrate and then decal transferred. The die-cut cathode- and anode-coated decals with an active area of 50 cm² were hot pressed onto the NAFION® 211 (25 μm, 1100 EW) membrane at 295° F. for 2 min at 0 lbs and 2 min at 5000 lbs. The 50-cm² catalyst coated membrane (CCM) is built with carbon paper coated with a proprietary microporous layer that serves as gas diffusion media (GDM), and with "dog-bone" flow-fields for small-scale (50-cm² active area) single-cell tests.

$H_2$/Air Fuel Cell Performance Test.

Fuel cell performance (FCPM) is tested with stoichiometries of 1.5 to 2.0 for $H_2$ and air at anode and cathode, respectively, (1.5/2.0 stoic, A/C) and 32% and 100% inlet relative humidity ($RH_{in}$). The current density is controlled sequentially at 0.05, 0.2, 0.4, 0.8, 1.0, 1.2, and 1.5 A·cm$^{-2}$. Polarization curves are plotted in the format of cell voltage versus current density under 32% and 100% $RH_{in}$, which is denoted as FCPM and Wet-FCPM, respectively.

Cathode ORR Kinetic Activity Test.

The cathode oxidation-reduction reaction (ORR) is tested under 100% $RH_{in}$ and 2.0/9.5 stoichiometries for $H_2$ and $O_2$ (A/C). The cell total pressure is maintained at 150 kPa$_{abs}$. The current density is controlled sequentially at 0.02, 0.03, 0.05, 0.1, 0.2, and 0.4 A·cm$^{-2}$. The catalytic activity of the cathode catalysts is evaluated at a high frequency resistance (HFR)-corrected voltage of 0.9 V vs. reference hydrogen electrode (RHE) at 80° C.

Voltage Cycling Test.

$H_2$ (200 standard cm³, sccm) and $N_2$ (50 sccm) are fed into the anode and cathode at 150 kPa$_{abs}$ in the voltage cycling test. The cell voltage is swept at 50 mV·s$^{-1}$ between 0.6 and 1.0 V$_{(RHE)}$ in a triangle profile for up to 30,000 cycles.

Results and Discussion.

The MEAs are subjected to the cathode catalytic activity ($H_2/O_2$) and the $H_2$/air performance tests before voltage cycling designated the beginning of life, (BOL, 0 cycles), and then after 10,000 voltage cycles and then after 30,000 voltage cycles, designated the end of life (EOL) of voltage cycling. The test results are shown graphically in FIGS. 9-16. Mass activity and the cell voltage at the current density of 1.5 A/cm² are summarized in Table 3. As shown, the sample MEA made with 5 wt. % poly(vinylbenzo-18-crown-6) in the cathode has a higher mass activity and fuel cell performance voltage than those of the baseline MEA (without polymeric crown additive) during all of the test stages. Analyses are performed on the baseline MEA sample and the MEA sample with 5 wt. % poly(vinylbenzo-18-crown-6) in the cathode at the beginning of life and after 30,000 C-V cycles. Cross-section images are all aligned with the anode side up. FIG. 9(b) shows that the baseline MEA has a bright Pt-line at the membrane-cathode interface after being tested for 30,000 CV cycles; whereas, there is a much-less obvious Pt-line in the MEA with the poly(vinylbenzo-18-crown-6) additive in the cathode [FIG. 10 (b)]. Two proposed mechanisms of catalyst activity loss are (1) the Oswald ripening of the Pt catalyst particles (dissolution and re-deposition of smaller particles to form bigger particles) and (2) Pt dissolution and diffusion towards the membrane. Although the amount of required poly(vinylbenzo-18-crown-6) additive has not been optimized, 5 wt. % of this additive to the cathode electrode reduces Pt dissolution and diffusion as evidenced by a distinct Pt line at the electrode-membrane interface [compare the white Pt line of FIG. 9(b) and the absence of this line in FIG. 10(b)]. The voltage-cycled electrode with the polymeric crown ether additive pictured in FIG. 10(b) has Pt distributed uniformly throughout the electrode layer as white speckles.

TABLE 3

Summary of testing results.

| Sample Description | Actual Pt loading mg/cm² | Mass Activity (A/mg) | FCPM Voltage at 1.5 A/cm² | Wet-FCPM Voltage at 1.5 A/cm² |
| --- | --- | --- | --- | --- |
| NRE 211 with Cathode Additive (BOL) | 0.1709 | 0.488 | 0.547 | 0.621 |
| NRE 211 with Cathode Additive after 10k cycles | 0.1709 | 0.428 | 0.483 | 0.557 |
| NRE 211 with Cathode Additive (EOL) | 0.1709 | 0.298 | 0.371 | 0.439 |
| NRE 211 Baseline (BOL) | 0.1735 | 0.334 | 0.521 | 0.601 |
| NRE 211 Baseline after 10k cycles | 0.1735 | 0.263 | 0.471 | 0.57 |
| NRE 211 Baseline (EOL) | 0.1735 | 0.206 | 0.412 | 0.516 |

Figure 9A:
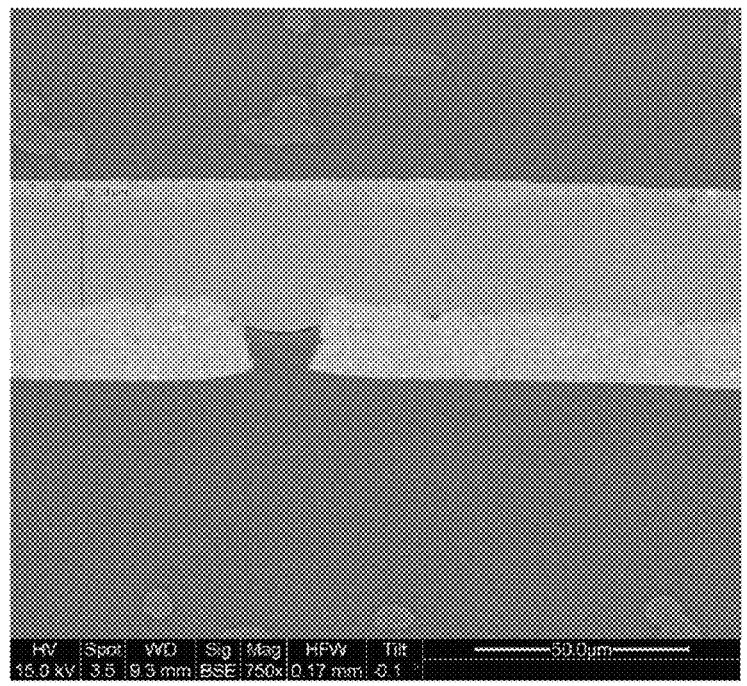
FIGS. 9A and 9B provide scanning electron microscope (SEM) images of a membrane electrode assembly at beginning of life and after 30,000 current-voltage (C-V) cycles of a baseline cathode without a cyclic crown additive.
Figure 9B:
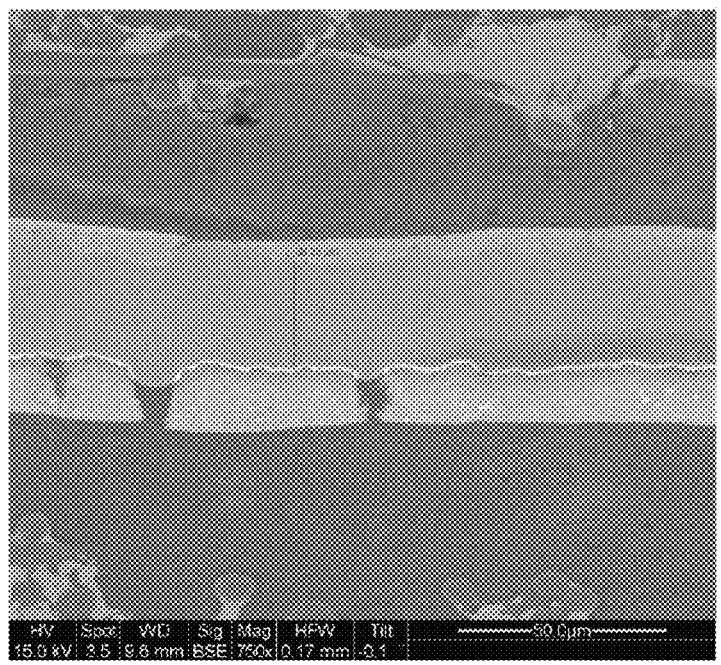
Figure 10A:
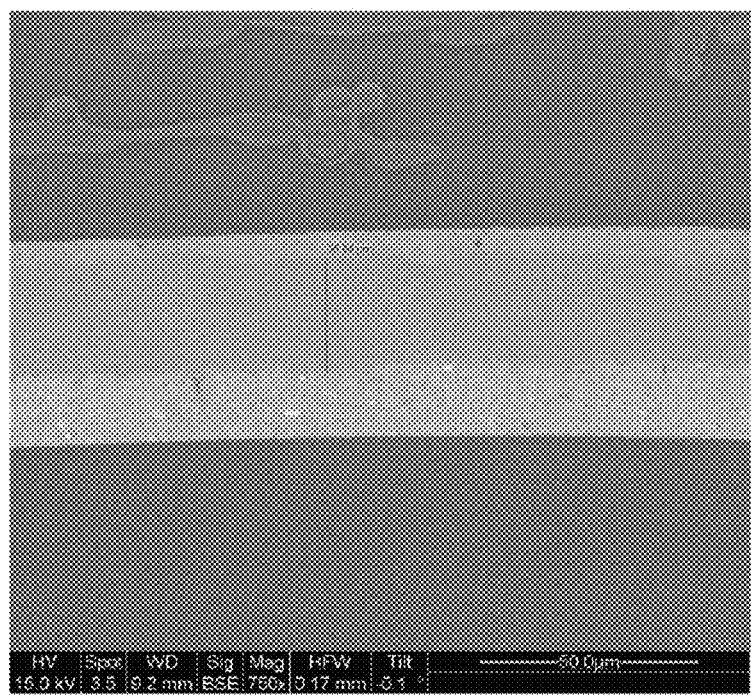
FIGS. 10A and 10B provide SEM images of a membrane electrode assembly with 5 wt % poly(vinylbenzo-18-crown-6) additive in the cathode at beginning of life and after 30,000 C-V cycles.
Figure 10B:
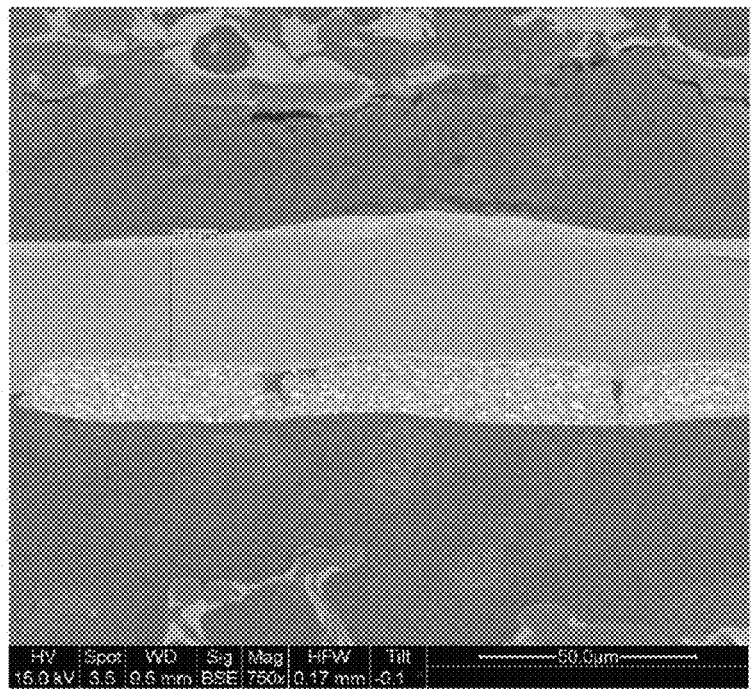
Figure 11A:
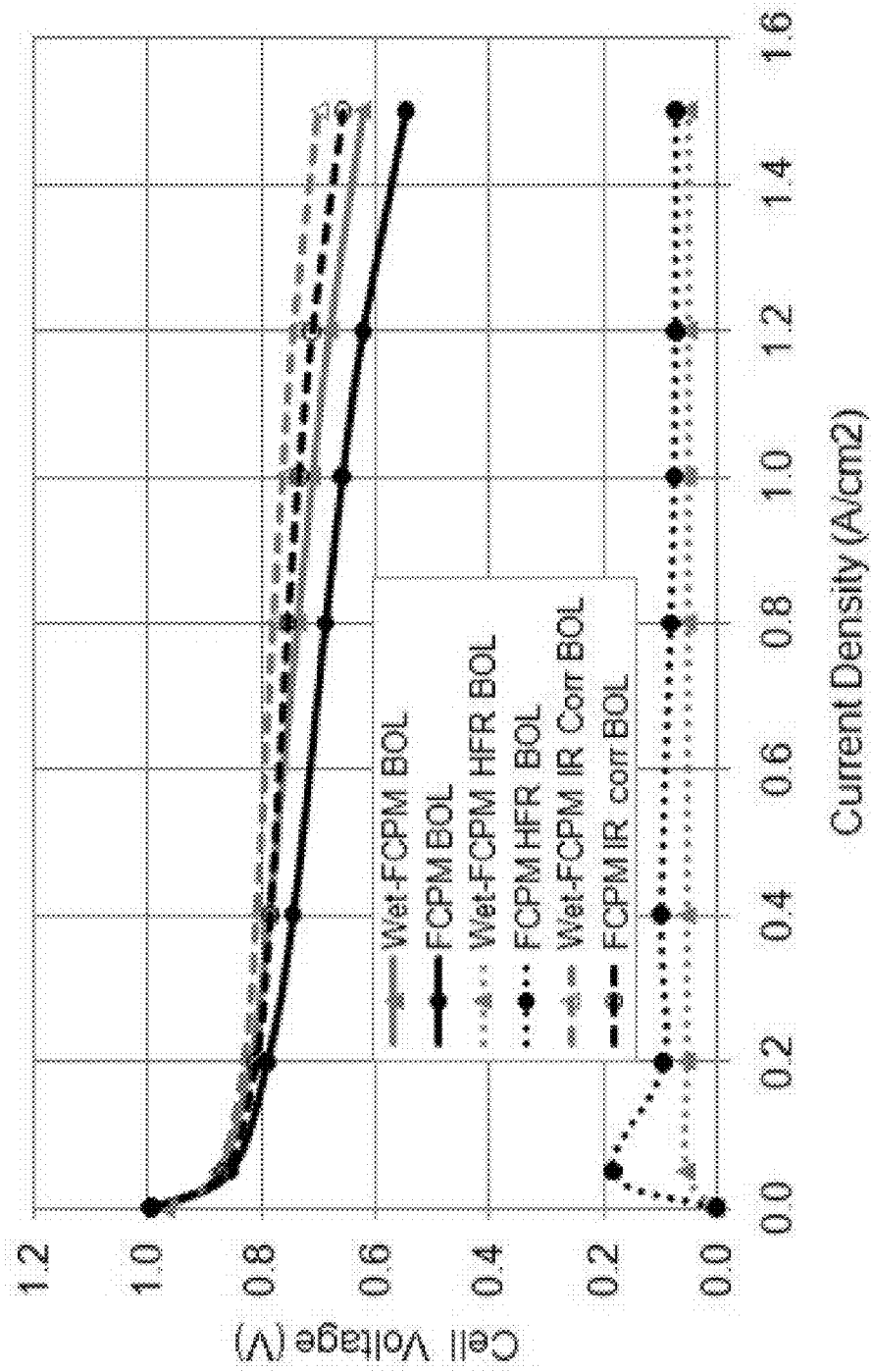
FIGS. 11A and 11B provide 50-cm$^2$ active area fuel cell performance of a membrane electrode assembly with 5 wt. % poly(vinylbenzo-18-crown-6) additive in the cathode (A) and a catalyst mass activity plot at beginning of life (B)
Figure 11B:
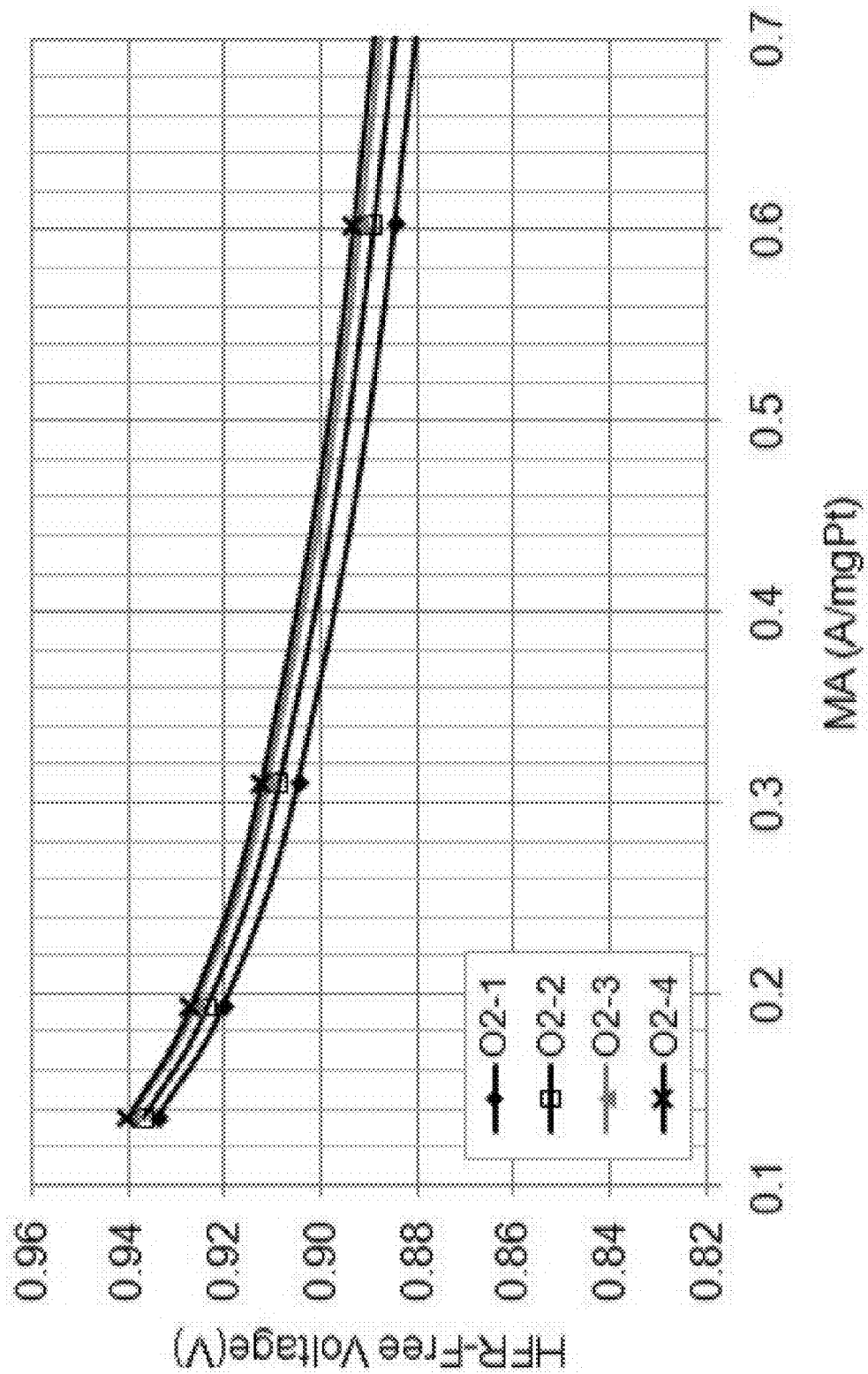
Figure 12A:
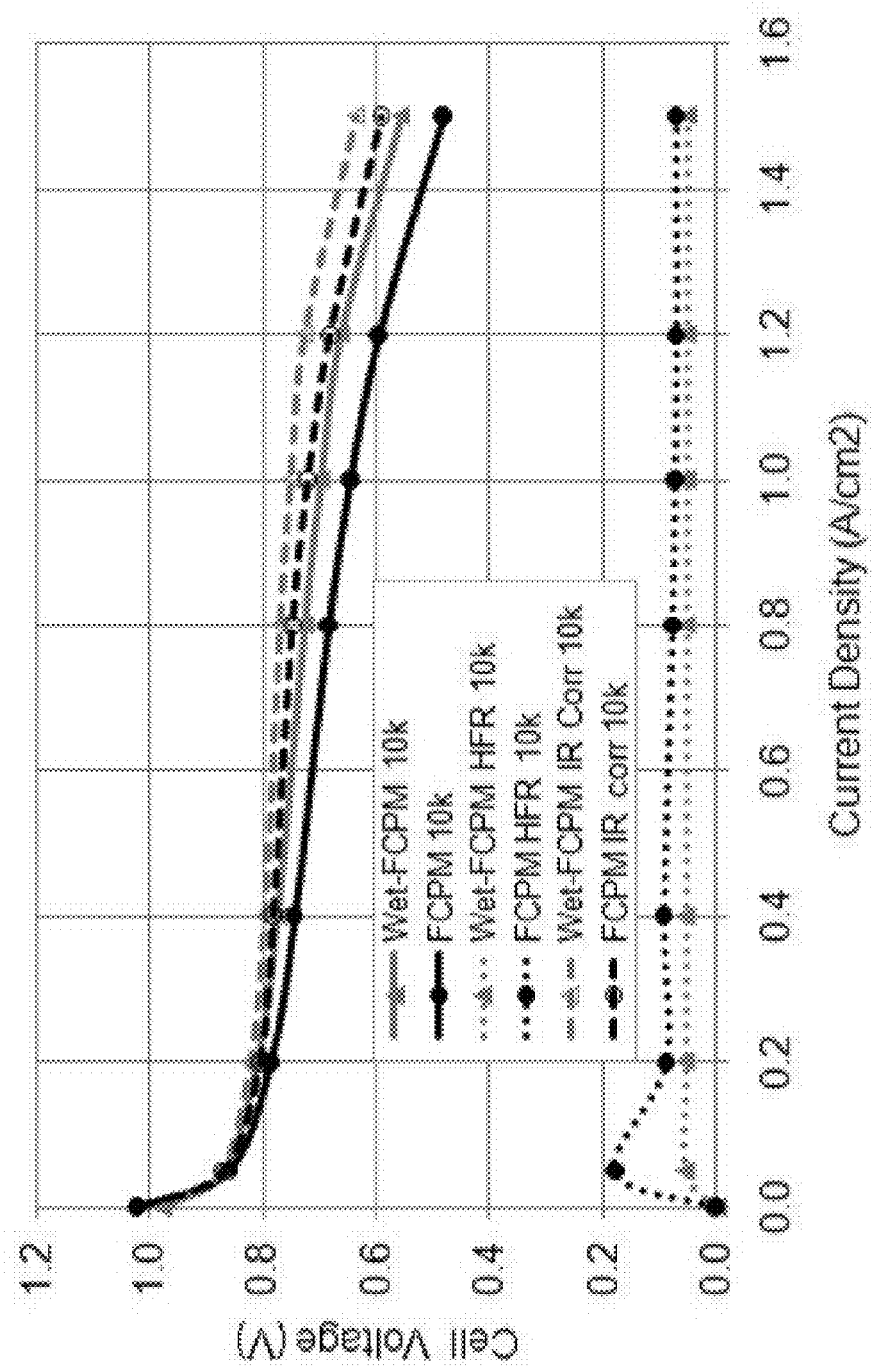
FIGS. 12A and 12B provide 50-cm$^2$ active area fuel cell performance of a membrane electrode assembly with 5 wt. % poly(vinylbenzo-18-crown-6) additive in the cathode (A) and a catalyst mass activity plot after 10,000 C-V cycles (B)
Figure 12B:
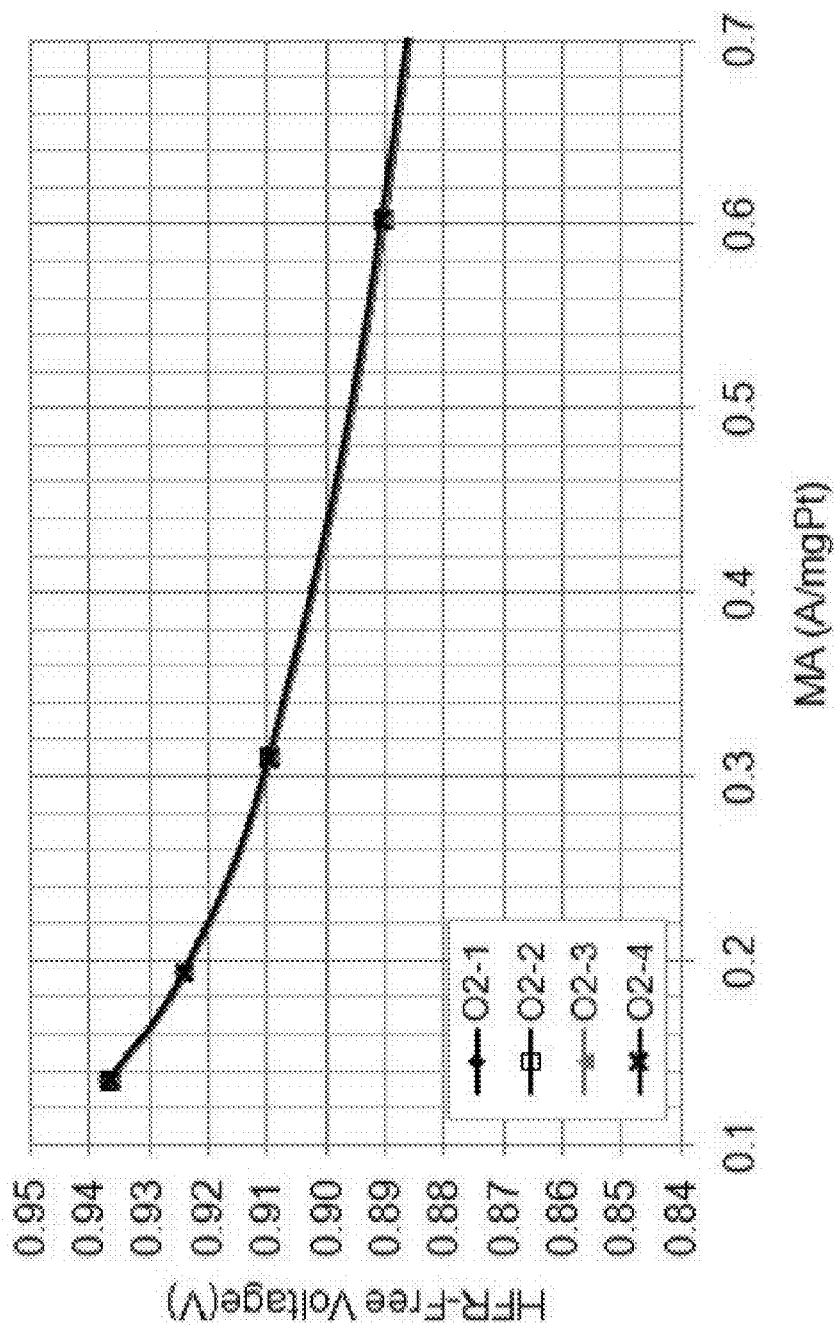
Figure 13A:
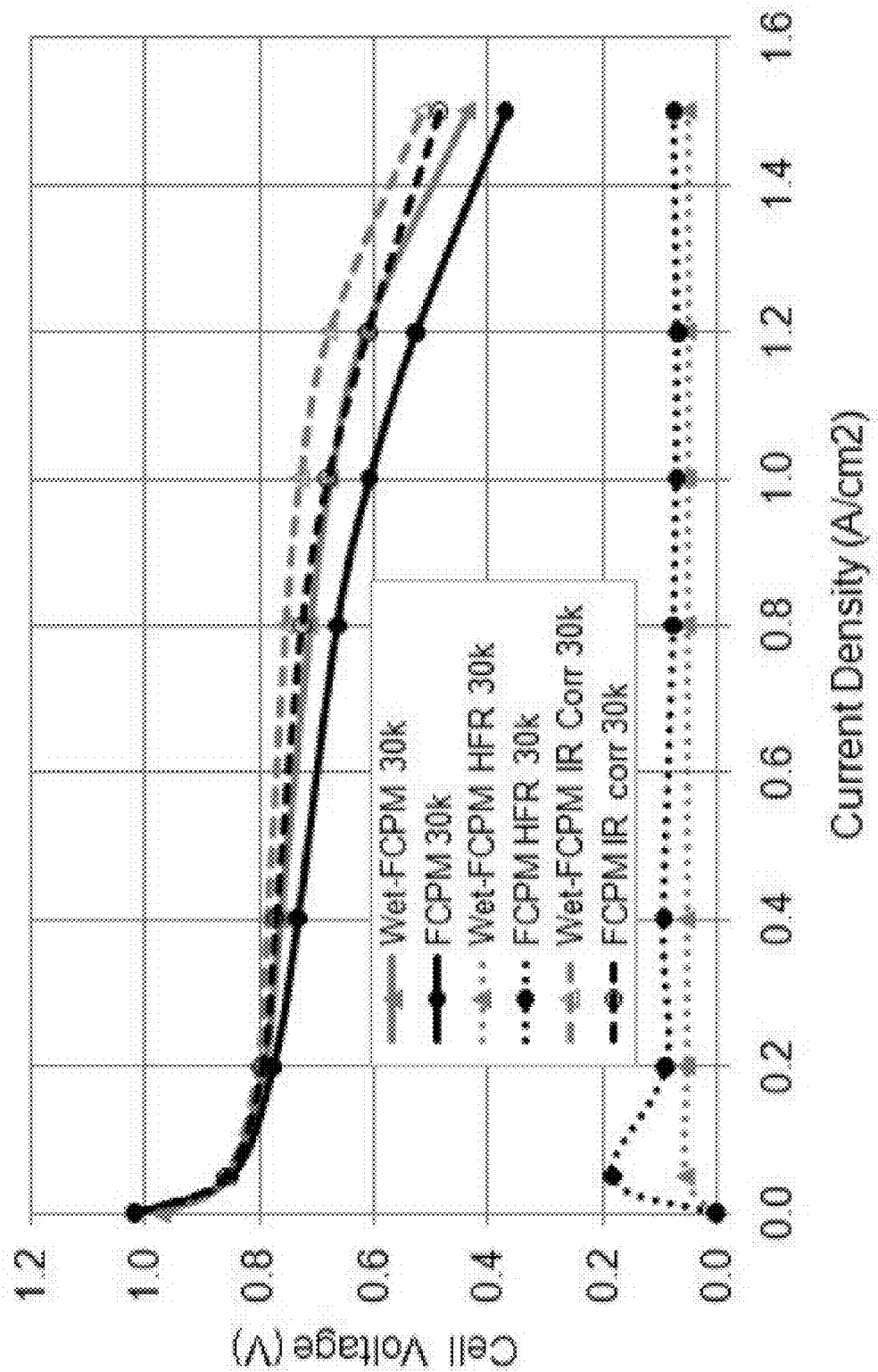
FIGS. 13A and 13B provide 50-cm$^2$ active area fuel cell performance of a membrane electrode assembly with 5 wt. % poly(vinylbenzo-18-crown-6) additive in the cathode (A) and a catalyst mass activity plot after 30,000 C-V cycles (B)
Figure 13B:
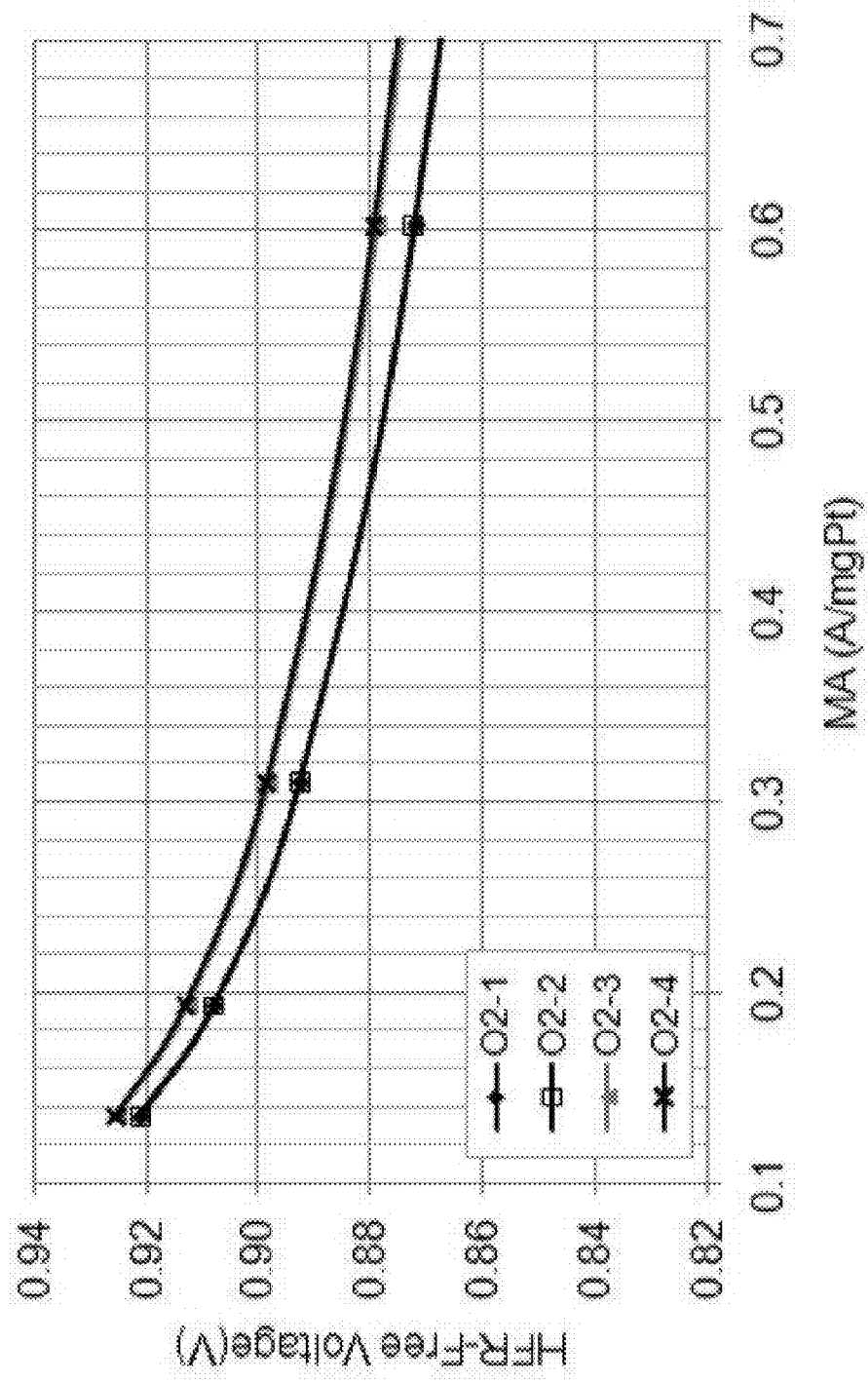
Figure 14A:
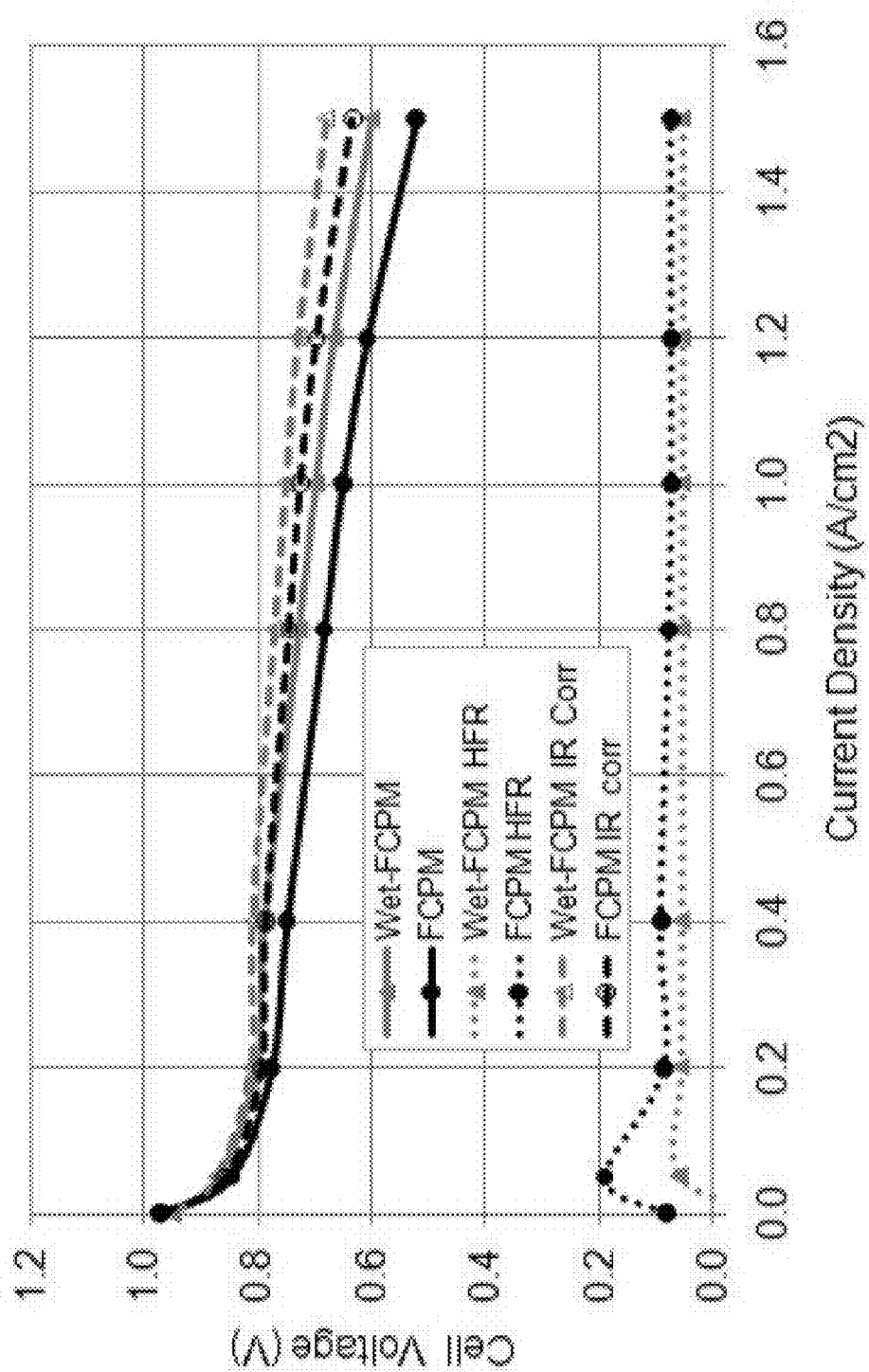
FIGS. 14A and 14B provide 50-cm$^2$ active area fuel cell performance of a baseline membrane electrode assembly without cyclic crown ether additive in the cathode (A) and a catalyst mass activity plot at beginning of life (B)
Figure 14B:
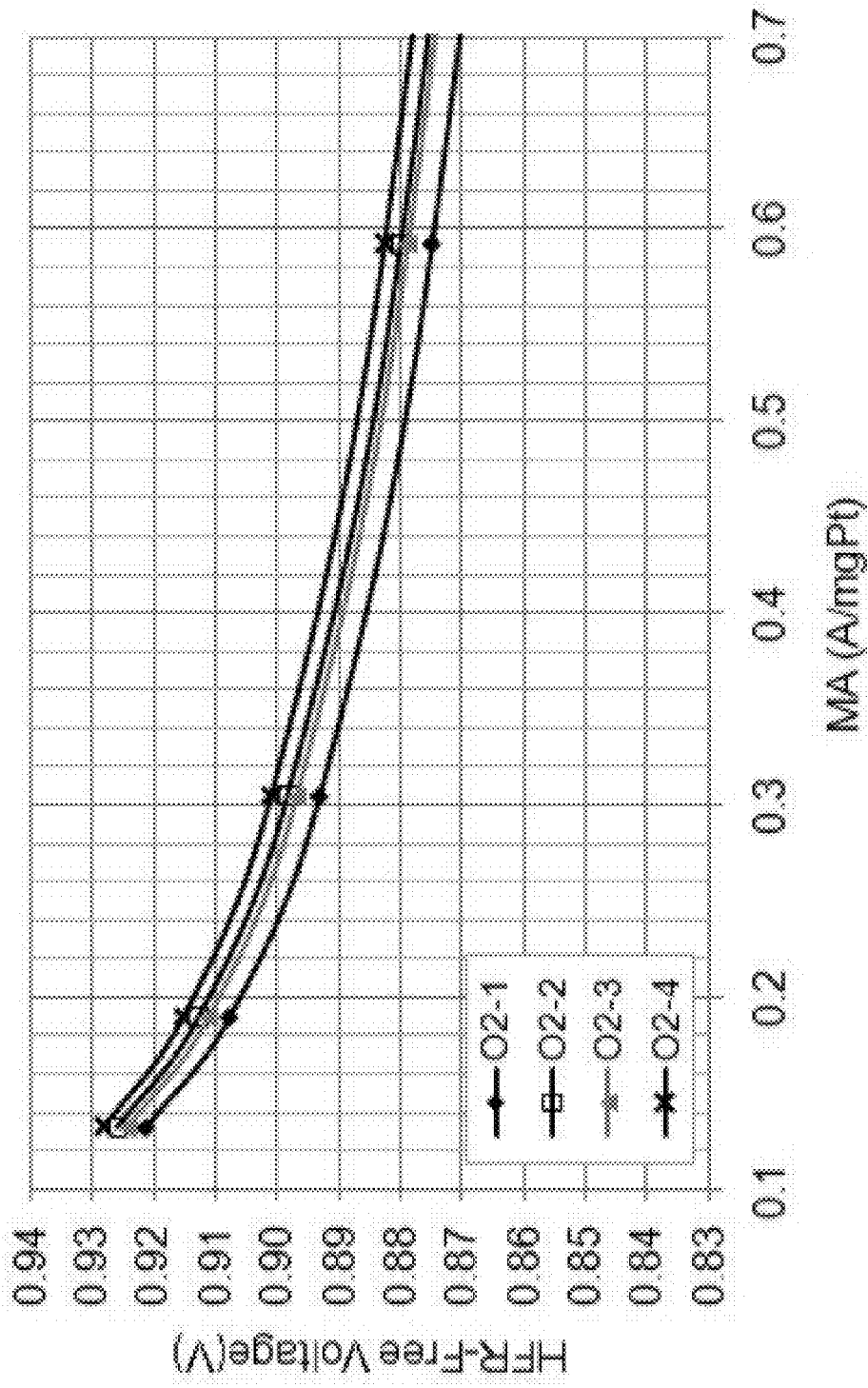
Figure 15A:
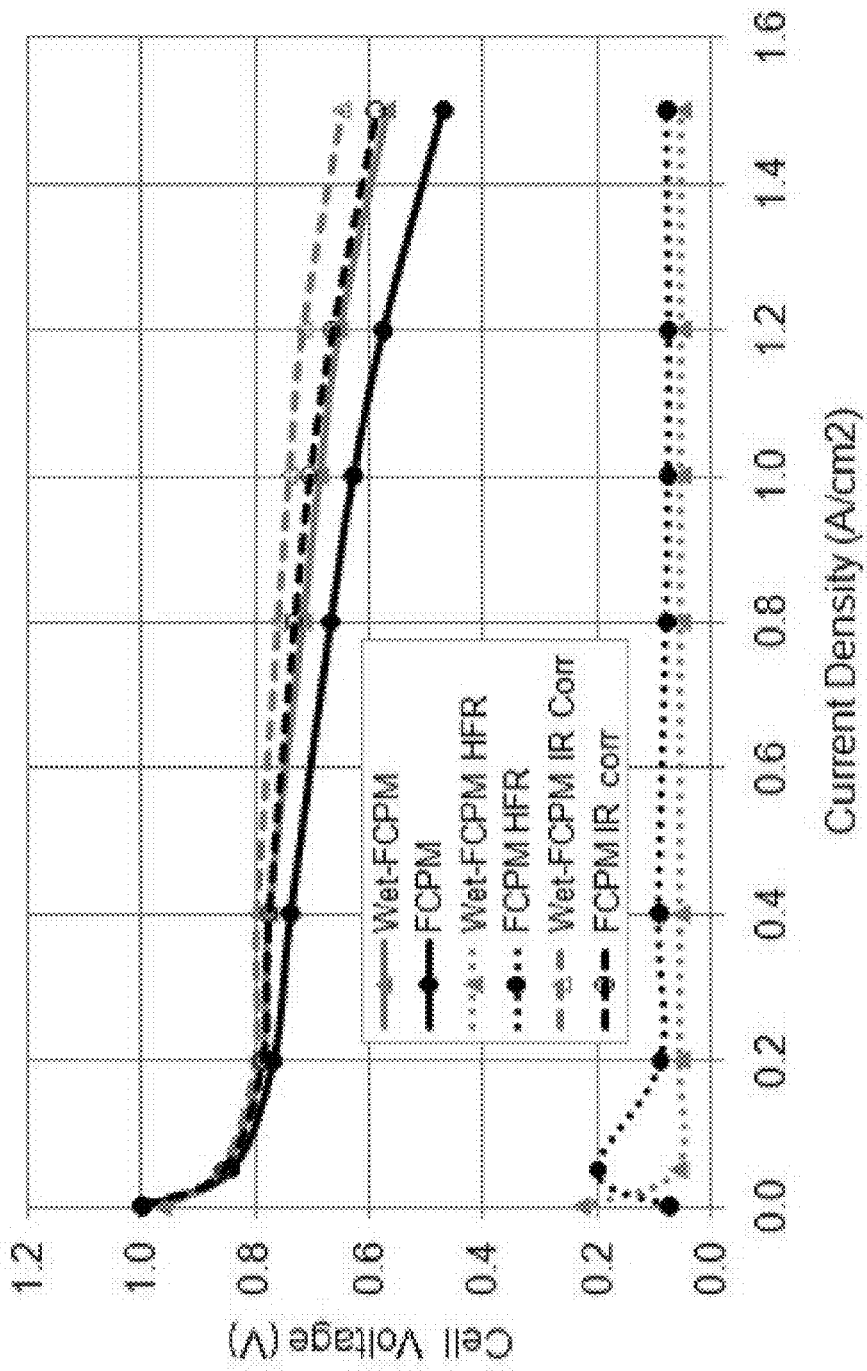
FIGS. 15A and 15B provides 50-cm$^2$ active area fuel cell performance of a baseline membrane electrode assembly without cyclic crown ether additive in the cathode (A) and a catalyst mass activity plot after 10,000 C-V cycles (B)
Figure 15B:
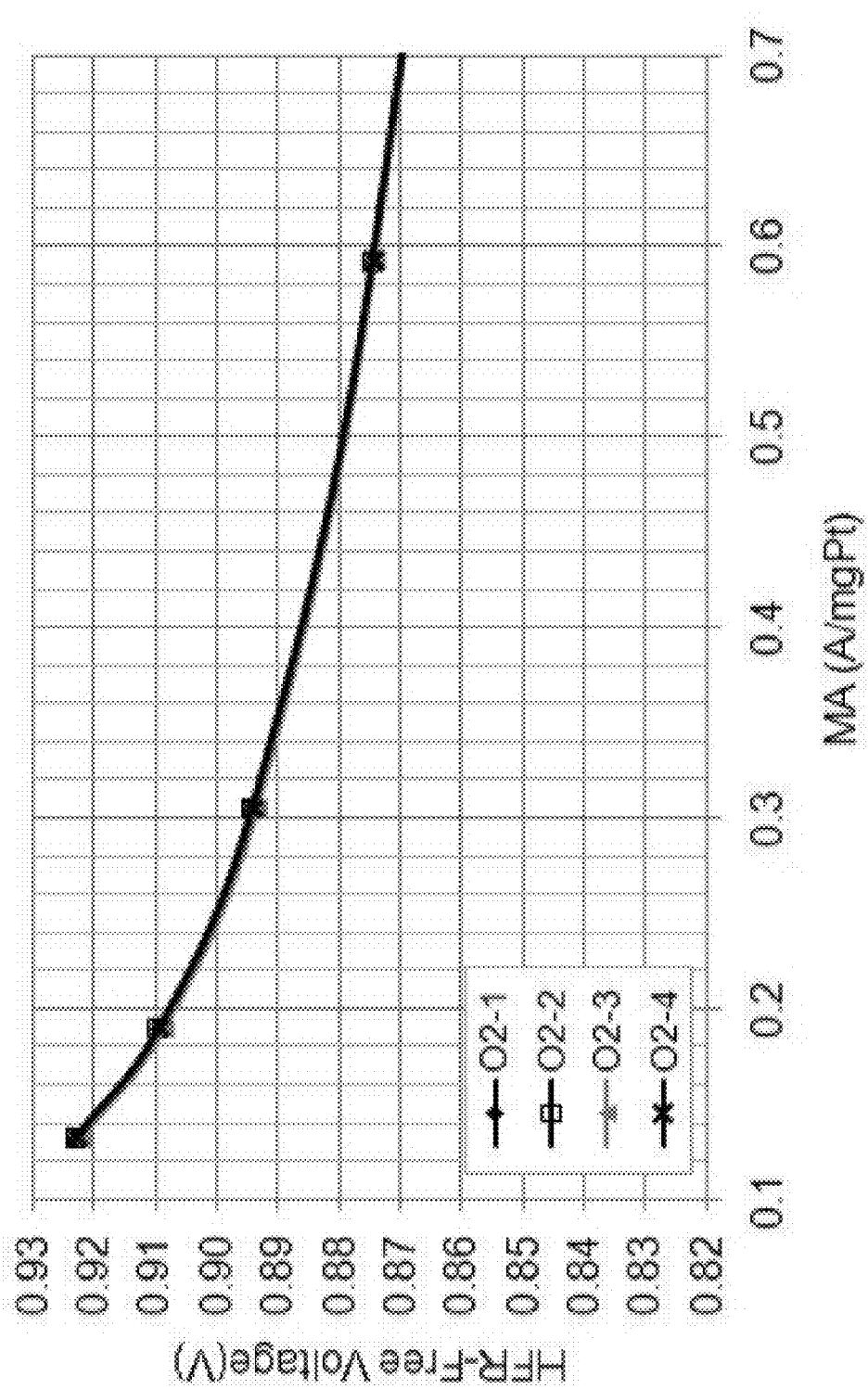
Figure 16A:
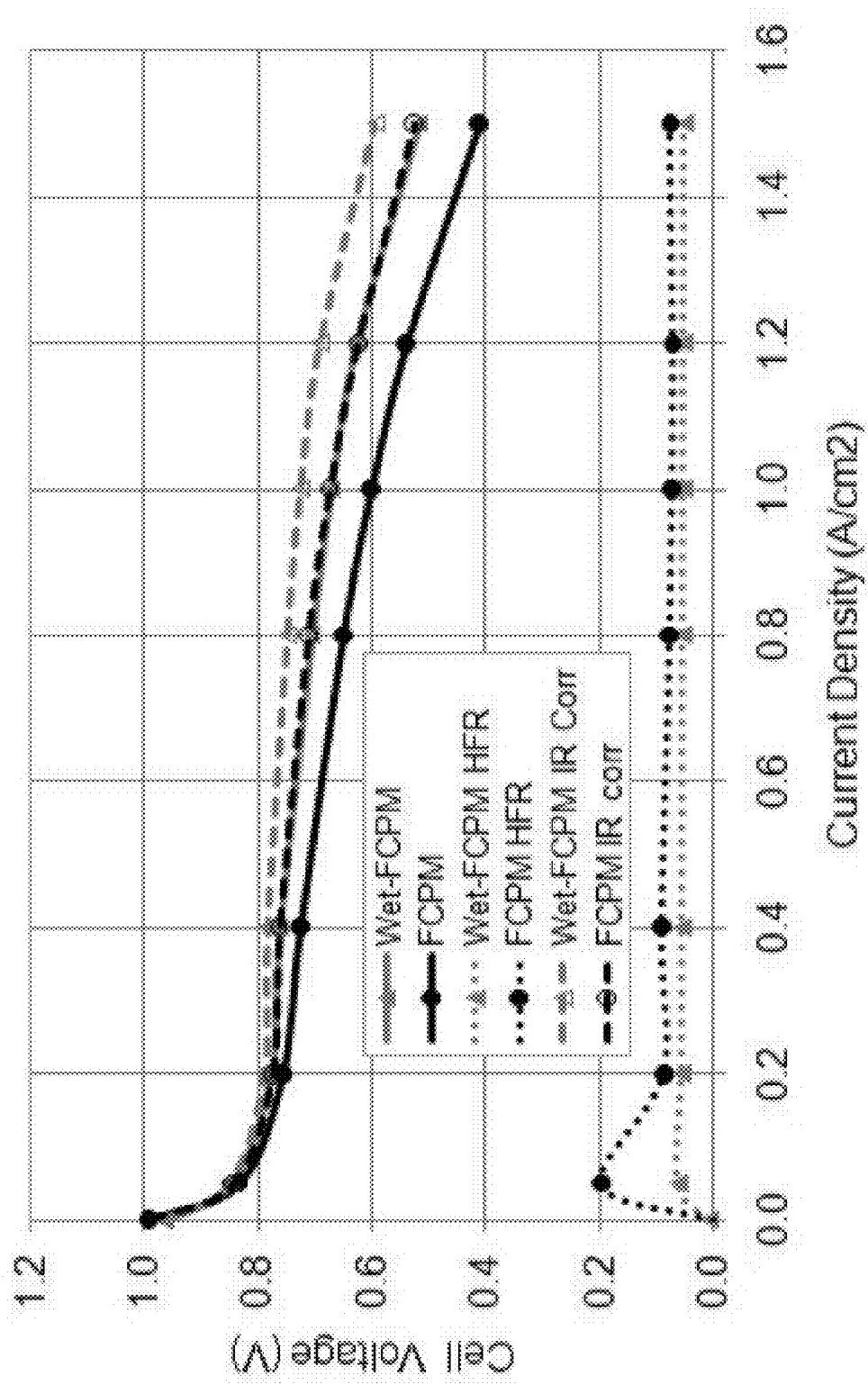
FIGS. 16A and 16B provide 50-cm$^2$ active area fuel cell performance of a baseline membrane electrode assembly without cyclic crown ether additive in the cathode (A) and a catalyst mass activity plot after 30,000 C-V cycles (B).
Figure 16B:
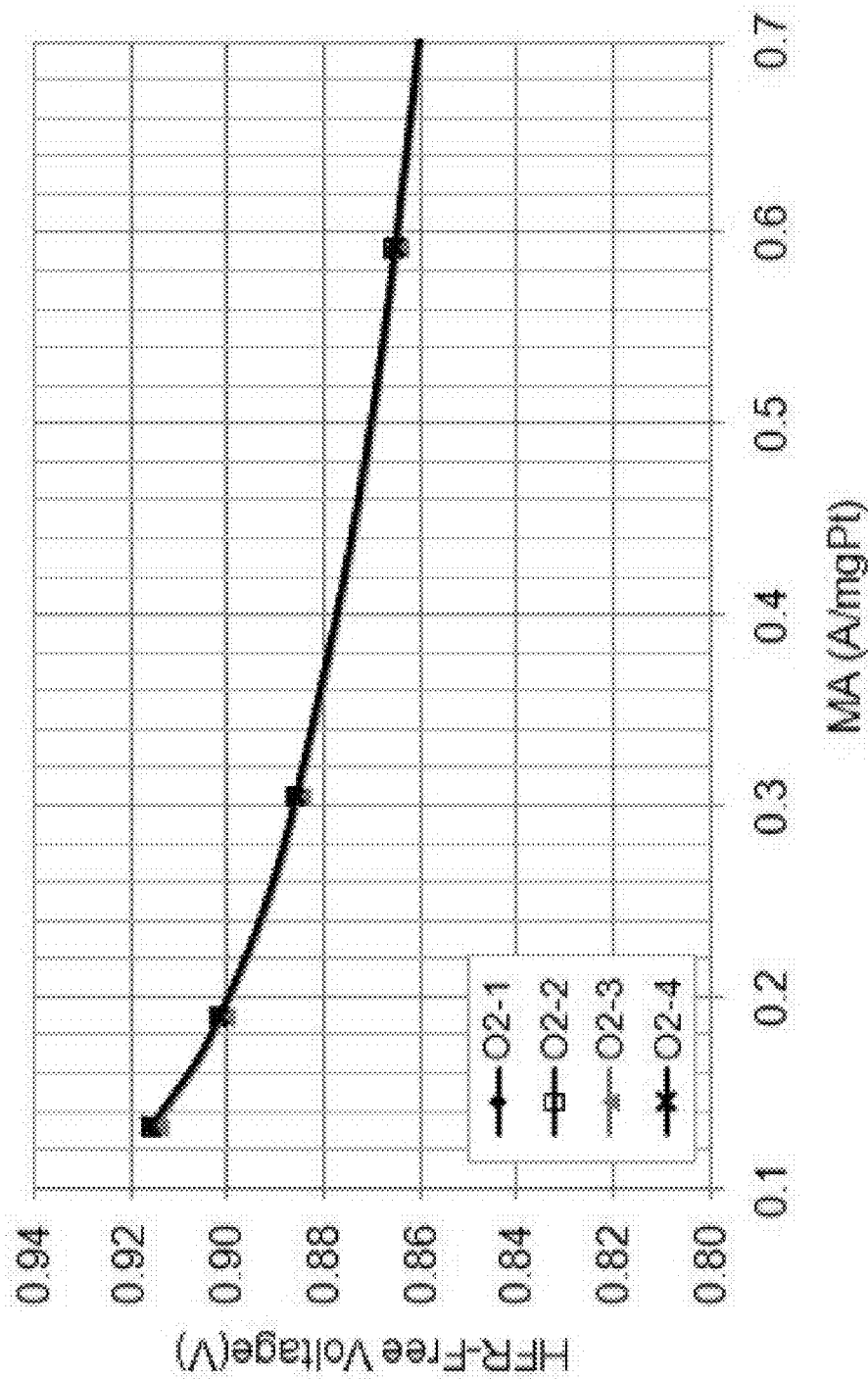

FIG. 9 provides cross-section images of baseline MEA at BOL (a) and after 30,000 C-V cycles (b). FIG. 10 provides cross-section images of MEA with 5 wt. % poly(vinylbenzo-18-crown-6) additive in the cathode at BOL (a) and after 30,000 C-V cycles (b). FIG. 11 provides small-scale (50-cm$^2$ active area) fuel cell performance of sample with 5 wt. % poly(vinylbenzo-18-crown-6) additive in the cathode (BOL) (a) and catalyst mass activity plot (BOL) (b). FIG. 12 provides small-scale fuel cell performance of sample with 5 wt. % poly(vinylbenzo-18-crown-6) additive in the cathode after 10,000 voltage cycles (a) and catalyst mass activity plot (b). FIG. 13 provides small-scale fuel cell performance of sample with 5 wt. % poly(vinylbenzo-18-crown-6) additive in the cathode after 30,000 voltage cycles (a) and catalyst mass activity plot (b). FIG. 14 provides small-scale fuel cell performance of sample baseline (BOL) (a) and catalyst mass activity plot (b). FIG. 15 provides small-scale fuel cell performance of sample baseline after 10,000 voltage cycles (a) and catalyst mass activity plot (b). FIG. 16 provides small-scale fuel cell performance of the baseline sample after 30,000 voltage cycles (a) and catalyst mass activity (MA) plot (b).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A membrane electrode assembly for a fuel cell, the membrane electrode assembly comprising:
a proton conducting membrane having a first side and a second side;
an anode catalyst layer disposed over the first side of the proton conducting layer; and
a cathode catalyst layer disposed over the second side of the proton conducting layer, at least one of the anode layer or the cathode layer including a first polymer including cyclic polyether groups and platinum, the platinum being sequestered by the cyclic polyether groups, the membrane electrode positioned between a first gas diffusion layer and a second gas diffusion layer and between an anode flow field plate and a cathode flow field plate.

2. The membrane electrode assembly of claim 1 wherein the first polymer includes cyclic ether groups present in an amount from about 0.01 to about 5 weight percent of the total weight of the anode layer or the cathode layer.

3. The membrane electrode assembly of claim 1 wherein the cyclic polyether groups are cryptands or crown ethers.

4. The membrane electrode assembly of claim 1 wherein the first polymer including cyclic polyether groups is a linear polymer.

5. The membrane electrode assembly of claim 4 wherein the linear polymer has the following formula:

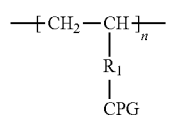

(24)

where $R_1$ is absent or a hydrocarbon group and CPG is a cyclic polyether group.

6. The membrane electrode assembly of claim 5 wherein $R_1$ is $C_{1-20}$ alkyl, $C_{1-18}$ polyether, $C_{6-20}$ alkylaryl, or $C_{6-20}$ aryl.

7. The membrane electrode assembly of claim 6 wherein CPG is selected from the group consisting of:

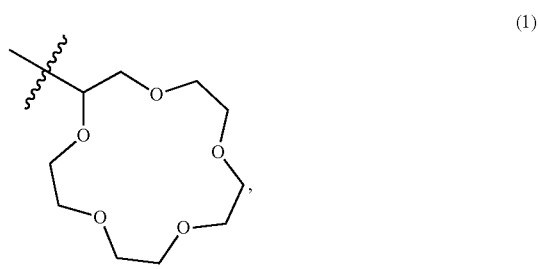
(1)

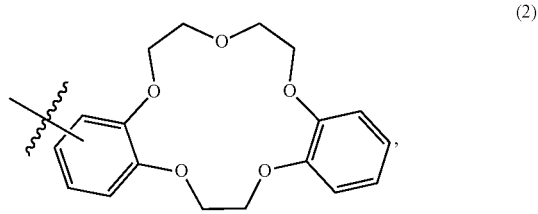
(2)

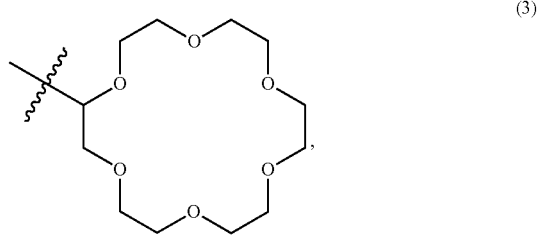
(3)

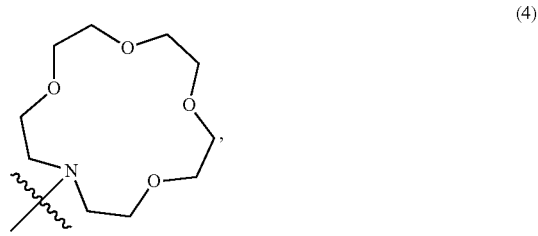
(4)

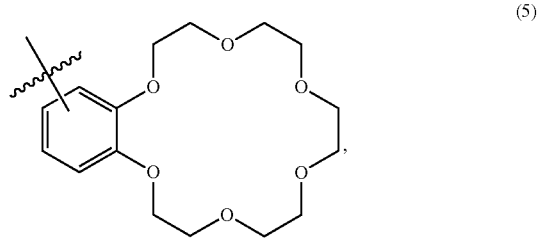
(5)

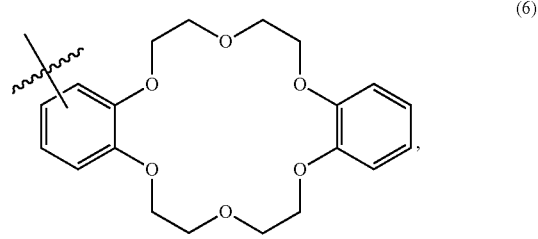
(6)

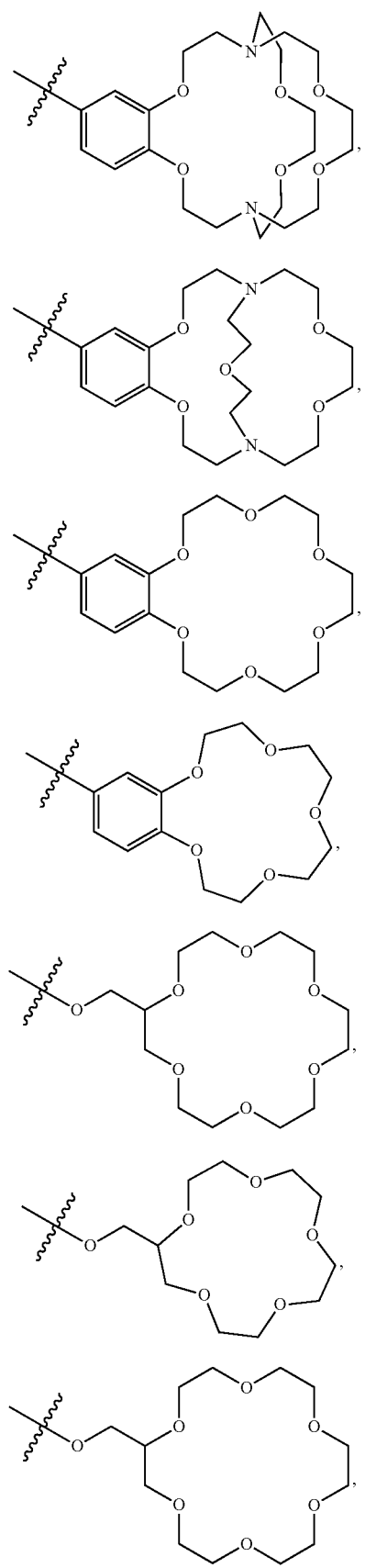
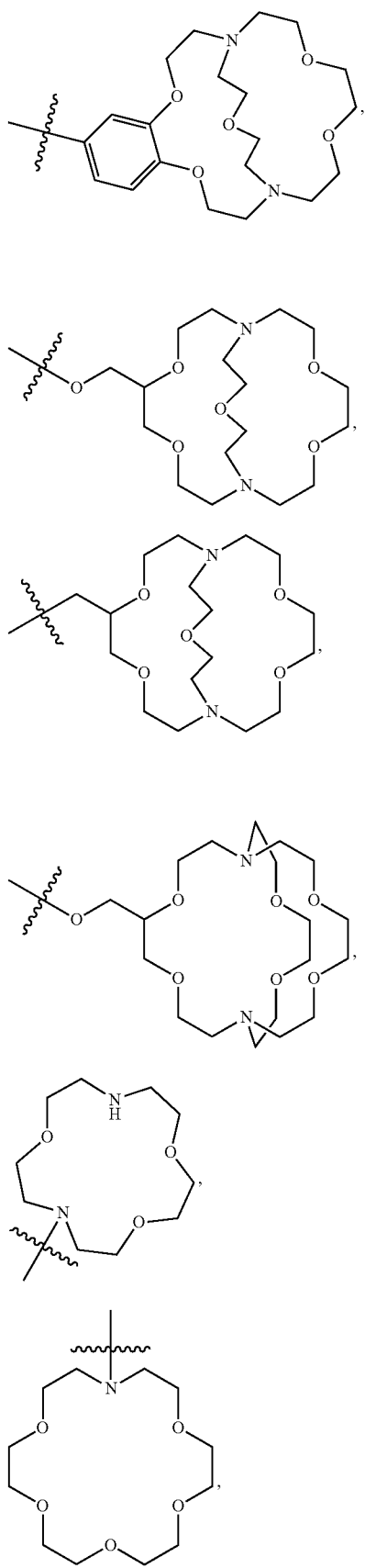

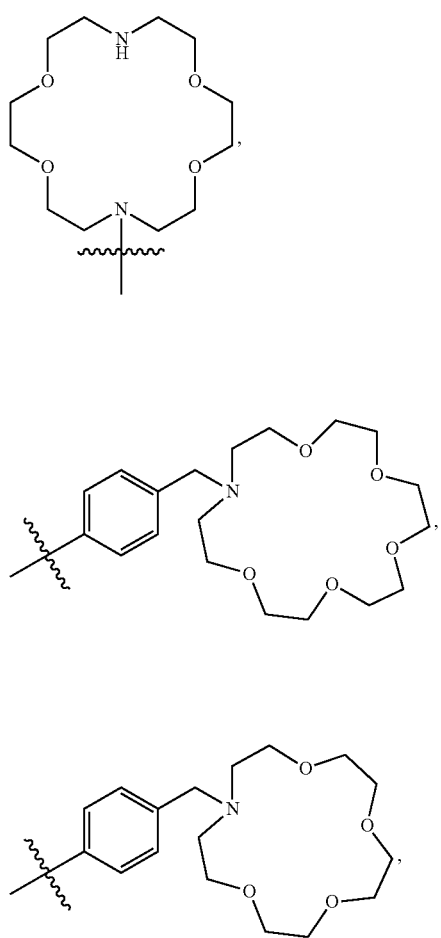

(20)

(21)

(22)

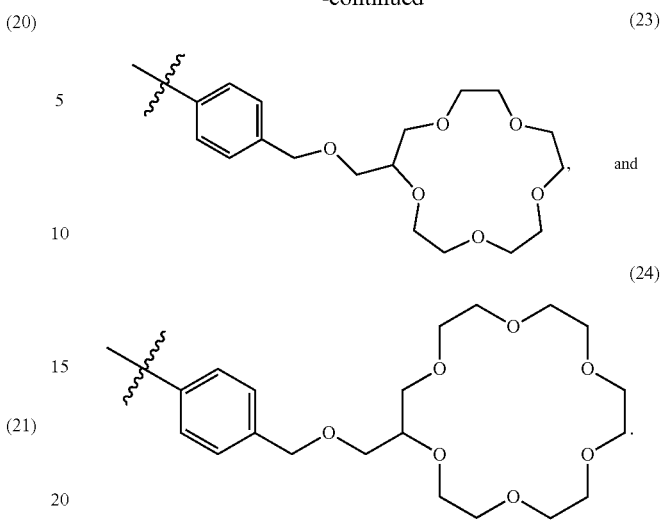

(23)

and (24)

8. The membrane electrode assembly of claim 1 wherein the anode layer and the cathode catalyst layer each independently include a second polymer having sulfonic acid groups selected from the group consisting of perfluorosulfonic acid (PFSA) polymers, polymers having perfluorocyclobutyl moieties, and combinations thereof.

9. The membrane electrode assembly of claim 1 wherein the first polymer includes polystyrene crosslinked with divinylbenzene in the form of beads, fibers, particulates or nanoparticles are functionalized with metal ionophores, the metal ionophores including platinum sequestered by the cyclic polyether groups.

10. The membrane electrode assembly of claim 1 wherein the anode layer and the cathode catalyst layer each independently include a second polymer having perfluorocyclobutyl moieties.

* * * * *